United States Patent
Asano et al.

(10) Patent No.: US 8,777,574 B2
(45) Date of Patent: Jul. 15, 2014

(54) WINDMILL PITCH DRIVING APPARATUS

(75) Inventors: Yoji Asano, Gifu (JP); Haruo Kodama, Gifu (JP); Katsuhiko Yokoyama, Gifu (JP)

(73) Assignee: Nabtesco Corporation, Tokyo (JP)

(*) Notice: Subject to any disclaimer, the term of this patent is extended or adjusted under 35 U.S.C. 154(b) by 484 days.

(21) Appl. No.: 13/131,676

(22) PCT Filed: Nov. 24, 2009

(86) PCT No.: PCT/JP2009/006305
§ 371 (c)(1),
(2), (4) Date: May 27, 2011

(87) PCT Pub. No.: WO2010/061571
PCT Pub. Date: Jun. 3, 2010

(65) Prior Publication Data
US 2011/0243739 A1    Oct. 6, 2011

(30) Foreign Application Priority Data
Nov. 29, 2008  (JP) ................................ 2008-305746

(51) Int. Cl.
*F03D 7/00* (2006.01)
(52) U.S. Cl.
USPC ........................................................ 416/155
(58) Field of Classification Search
USPC ......... 416/153, 155, 159, 160, 162, 174, 205, 416/209, 164, 165
See application file for complete search history.

(56) References Cited

U.S. PATENT DOCUMENTS

| | | | | |
|---|---|---|---|---|
| 1,928,982 A | * | 10/1933 | Rosenbaum | 411/222 |
| 3,182,526 A | * | 5/1965 | Zajac | 475/2 |
| 3,217,128 A | * | 11/1965 | Cowan | 200/502 |
| 3,268,044 A | * | 8/1966 | Lippman | 192/84.1 |
| 3,705,524 A | * | 12/1972 | Greenwood | 81/124.7 |
| 4,749,335 A | * | 6/1988 | Brandt et al. | 416/157 R |

(Continued)

FOREIGN PATENT DOCUMENTS

| EP | 1 662 138 A1 | 5/2006 |
|---|---|---|
| EP | 1 767 815 A2 | 3/2007 |

(Continued)

OTHER PUBLICATIONS

Japanese Office Action 'Notification of Reasons for Refusal' dated May 8, 2013, which corresponds to Japanese Patent Application No. 2009-264719 and is related to U.S. Appl. No. 13/131,676 with translation.

(Continued)

*Primary Examiner* — Nathaniel Wiehe
*Assistant Examiner* — Eldon Brockman
(74) *Attorney, Agent, or Firm* — Studebaker & Brackett PC

(57) ABSTRACT

A windmill pitch driving apparatus is provided, which is capable of achieving improved durability as well as improved output torque and reduced size. The apparatus includes a fixing mechanism for fixing the output pinion to the output shaft. The fixing mechanism includes a positioning portion and a pressure-applying fixing portion. The positioning portion positions the other end side of the pinion with respect to the output shaft side. The pressure-applying fixing portion biases the pinion toward the output shaft in the direction of the axis P of the output shaft from the one end side and is fixed to the output shaft while applying pressure to the pinion.

10 Claims, 13 Drawing Sheets

(56) References Cited

U.S. PATENT DOCUMENTS

| | | | |
|---|---|---|---|
| 4,895,048 A * | 1/1990 | Key et al. | 74/625 |
| 5,154,560 A * | 10/1992 | Copito | 411/266 |
| 5,415,595 A * | 5/1995 | Nelson | 475/7 |
| 6,743,002 B1 * | 6/2004 | Millar et al. | 418/61.3 |
| 6,752,032 B2 * | 6/2004 | Yamauchi | 74/7 C |
| 7,000,995 B2 * | 2/2006 | Hagelthorn | 301/105.1 |
| 2009/0038904 A1 * | 2/2009 | Bosk | 192/56.1 |
| 2010/0004087 A1 | 1/2010 | Minegishi et al. | |
| 2011/0214960 A1 * | 9/2011 | Bosk | 192/56.1 |

FOREIGN PATENT DOCUMENTS

| | | |
|---|---|---|
| EP | 1 895 190 A1 | 3/2008 |
| JP | S58-178522 U | 11/1983 |
| JP | S61-126119 U | 8/1986 |
| JP | 63-139353 | 9/1988 |
| JP | 64-025531 | 2/1989 |
| JP | 01-082365 | 6/1989 |
| JP | H08-277863 A | 10/1996 |
| JP | 2000-248957 A | 9/2000 |
| JP | 2001-027310 A | 1/2001 |
| JP | 2002-137604 A | 5/2002 |
| JP | 2002-168323 A | 6/2002 |
| JP | 2005-30264 A | 2/2005 |
| JP | 2005-233055 A | 9/2005 |
| JP | 2007-278178 A | 10/2007 |
| WO | 2008096747 A1 | 8/2008 |

OTHER PUBLICATIONS

International Search Report; PCT/JP2009/006305; Mar. 2, 2010.
The Extended European Search Report dated Mar. 22, 2012; Application No./Patent No. 09828821.0-1254/ 2351948 PCT/JP2009006305.
An Office Action; "Notice of Reason for Rejection," issued by the Japanese Patent Office on Mar. 19, 2014, which corresponds to Japanese Patent Application No. 2013-140606 and is related to U.S. Appl. No. 13/131,676; with English language partial translation.

* cited by examiner

WINDMILL PITCH DRIVING APPARATUS

TECHNICAL FIELD

The present invention relates to a windmill pitch driving apparatus that can be provided in a windmill and used as a driving apparatus for controlling the pitch angle of a blade that is rotatably provided on a main shaft portion of the windmill.

BACKGROUND ART

Windmills may be provided with a windmill pitch driving apparatus that is used as a driving apparatus for controlling the pitch angle of a blade that is rotationally provided on the main shaft portion of the windmill. With recent trends such as increased windmill sizes and increased blade diameters, a situation has arisen where there is a demand for a windmill pitch driving apparatus with high-output specifications having improved output torque. Meanwhile, windmill pitch driving apparatuses are also required to have a smaller configuration because there is only limited space in a windmill for installing the windmill pitch driving apparatuses.

In view of this, an eccentric speed reducer provided with external teeth that rotate eccentrically, as disclosed in PTL 1, is known as an example of a windmill pitch driving apparatus capable of achieving a high speed reduction ratio, which is necessary to improve output torque and reduce size. In the windmill pitch driving apparatus disclosed in PTL 1, an output pinion (530) is attached to an output shaft (374). A plate member is fixed to the end of the output shaft with bolts and regulates pinion movement in the axial direction of the output shaft.

CITATION LIST

Patent Literature

PTL 1; WO 2008/096747 (p. 14; FIGS. 15 and 16)

DISCLOSURE OF INVENTION

Problem to be Solved by the Invention

The windmill pitch driving apparatus disclosed in PTL 1, which is configured as an eccentric speed reducer, can achieve reduced size as well as improved output torque. With rotation of the main shaft portion of the windmill, the windmill pitch driving apparatus rotates around the main shaft portion together with the blade. However, in the windmill pitch driving apparatus disclosed in PTL 1 with the configuration in which the pinion movement in the axial direction of the output shaft is regulated by the plate member fixed to the end of the output shaft, a very small amount of displacement of the pinion with respect to the output shaft tends to occur within the range in which the pinion movement is regulated. Accordingly, vibrations or backlash of the pinion with respect to the output shaft is likely to occur, which may cause damage to the output shaft and the pinion and accordingly reduce the durability of the windmill pitch driving apparatus. In addition, the occurrence of vibrations or backlash may also cause a reduction in the driving efficiency of the windmill pitch driving apparatus during operation.

The windmill pitch driving apparatus disclosed in PTL 1 further has the problem that lubrication in a spline coupling portion between the output shaft and the pinion is not ensured, and therefore fretting wear tends to occur in the spline coupling portion due to repeated rotation of the windmill pitch driving apparatus. This may cause damage to the output shaft and the pinion and reduce the durability of the windmill pitch driving apparatus.

In view of the foregoing circumstances, it is an object of the present invention to provide a windmill pitch driving apparatus that is capable of achieving improved durability as well as improved output torque and reduced size.

Means for Solving Problem

In order to achieve the above-described object, a windmill pitch driving apparatus according to a first aspect of the present invention is provided in a windmill and used as a driving apparatus for controlling a pitch angle of a blade that is rotatably provided on a main shaft portion of the windmill, and includes a casing, a plurality of internal tooth pins disposed on an inner circumference of the casing and formed as pin-shaped members, an external tooth gear housed in the casing and provided with external teeth formed on its outer circumference that mesh with the internal tooth pins, a crankshaft extending through a crank hole formed in the external tooth gear, and configured to rotate so as to let the external tooth gear rotate eccentrically, a base carrier rotatably holding the crankshaft on one end side, an end carrier rotatably holding the crankshaft on the other end side, a strut disposed between the base carrier and the end carrier so as to provide a connection between the base carrier and the end carrier, an output shaft fixed to the base carrier, an output pinion attached to the output shaft, and a fixing mechanism for fixing the pinion to the output shaft. In the windmill pitch driving apparatus according to the first aspect of the present invention, the fixing mechanism includes a positioning portion configured to position the pinion on the other end side with respect to the output shaft side, and a pressure-applying fixing portion configured to bias the pinion toward the output shaft in an axial direction of the output shaft from the one end side, the pressure-applying fixing portion being fixed to the output shaft while applying pressure to the pinion.

According to this aspect of the present invention, the windmill pitch driving apparatus is configured as an eccentric speed reducer provided with the external tooth gears, which rotate eccentrically. Accordingly, a high speed reduction ratio is ensured, and improved output torque is achieved. The windmill pitch driving apparatus, which is configured as an eccentric speed reducer, is capable of achieving a high speed reduction ratio with a small configuration. Furthermore, in the windmill pitch driving apparatus according to this aspect of the present invention, the fixing mechanism for fixing the pinion to the output shaft is provided with a pressure-applying fixing portion that is configured to bias the pinion from the one end side, the pressure-applying fixing portion being fixed to the output shaft while applying pressure to the pinion. Accordingly, the pinion is fixed in a constrained state while being strongly pressed toward the output shaft in the axial direction, and thereby even small amounts of displacement of the pinion with respect to the output shaft are suppressed. This makes vibrations or backlash of the pinion with respect to the output shaft less likely to occur even if the windmill pitch driving apparatus rotates around the main shaft portion together with the blade and thereby suppresses the occurrence of damage to the output shaft and the pinion, thus improving the durability of the windmill pitch driving apparatus. In addition, the driving efficiency of the windmill pitch driving apparatus during operation can also be improved because the occurrence of vibrations or backlash is suppressed as described above.

It is thus possible according to this aspect of the present invention to provide a windmill pitch driving apparatus that is capable of achieving improved durability as well as improved output torque and reduced size.

A windmill pitch driving apparatus according to a second aspect of the present invention is the windmill pitch driving apparatus of the first aspect of the present invention, in which the fixing mechanism further includes a disc spring disposed around the output shaft, and the pressure-applying fixing portion is configured to bias the pinion via the disc spring.

According to this aspect of the present invention, the pressure-applying fixing portion biases the pinion toward the output shaft in the axial direction of the output shaft via the disc spring disposed around the output shaft. Accordingly, backlash of the pinion with respect to the output shaft is efficiently absorbed in a state where pressure is always being ensured by elastic deformation of the disc spring, and therefore the pinion is more strongly pressed toward the output shaft and fixed to the output shaft. This further suppresses the occurrence of vibrations or backlash of the pinion with respect to the output shaft, thus further improving the durability of the windmill pitch driving apparatus.

A windmill pitch driving apparatus according to a third aspect of the present invention is the windmill pitch driving apparatus according to the first aspect of the present invention, in which the pressure-applying fixing portion is provided as a plurality of ring nuts configured to be threadedly engaged with an outer circumference of the output shaft, the plurality of ring nuts being disposed so as to abut on one another in a direction parallel or oblique to the axial direction of the output shaft.

According to this aspect of the present invention, the pressure-applying fixing portion is provided as a plurality of ring nuts that are disposed so as to abut on one another and to be threadedly engaged with the output shaft. Accordingly, the pinion can be more strongly pressed toward the output shaft and fixed to the output shaft with the biasing force of the plurality of ring nuts. In addition, the threaded engagement of the ring nuts, abutting on one another, with the output shaft constrains rotational displacement of the respective ring nuts and reliably prevents the loosening of the ring nuts. Accordingly, it is possible to permanently maintain a state in which the pinion is under pressure and to thereby permanently suppress the occurrence of vibrations or backlash of the pinion with respect to the output shaft.

A windmill pitch driving apparatus according to a fourth aspect of the present invention is the windmill pitch driving apparatus according to the first aspect of the present invention, in which the pressure-applying fixing portion includes a presser plate member configured to bias the pinion on the one end side, and a fixing bolt configured to extend through the presser plate member and to be threadedly engaged with the output shaft on the one end side, and a gap is formed between an end of the output shaft on the one end side and the presser plate member, and the fixing bolt is configured to be threadedly engaged with the output shaft so as to bias the pinion via the presser plate member and cause pressure on the pinion.

According to this aspect of the present invention, the pressure-applying fixing portion can be easily configured at low cost by simply-structured members, namely, the presser plate member and the fixing bolt. With a gap formed between the output shaft and the presser plate member, pressure can be easily caused on the pinion by the threaded engagement of the fixing bolt with the output shaft via the presser plate member. It is thus possible according to this aspect of the present invention to easily realize, with a simple configuration, a windmill pitch driving apparatus that is capable of achieving improved durability as well as improved output torque and reduced size.

A windmill pitch driving apparatus according to a fifth aspect of the present invention is the windmill pitch driving apparatus according to one of the first aspect of the present invention, in which the positioning portion, configured to position the pinion on the other end side with respect to the output shaft side, is integrally formed with the pinion so as to abut on a main bearing on the one end side, the main bearing being attached to an outer circumference of the output shaft so as to rotatably hold the output shaft with respect to the casing.

According to this aspect of the present invention, the integral formation of the positioning portion with the pinion eliminates the need to manufacture the positioning portion as a separate member and further eliminates the need of extra assembly work for attaching the positioning portion to the output shaft. This reduces the number of constituent members and the number of assembly steps. Furthermore, according to this aspect of the present invention, the attachment of the pinion to the output shaft allows the positioning portion, which is integrally formed with the pinion, to simultaneously support the main bearing on the one end side. Accordingly, the efficiency of assembly work is further improved. It is thus possible according to this aspect of the present invention to simplify the configuration of the windmill pitch driving apparatus that is capable of achieving improved durability as well as improved output torque and reduced size, and to improve the efficiency of assembly work.

A windmill pitch driving apparatus according to a sixth aspect of the present invention is provided in a windmill and used as a driving apparatus for controlling a pitch angle of a blade that is rotatably provided on a main shaft portion of the windmill, and includes a casing, a plurality of internal tooth pins disposed on an inner circumference of the casing and formed as pin-shaped members, an external tooth gear housed in the casing and provided with external teeth formed on its outer circumference that mesh with the internal tooth pins, a crankshaft extending through a crank hole formed in the external tooth gear, and configured to rotate so as to let the external tooth gear rotate eccentrically, a base carrier rotatably holding the crankshaft on one end side, an end carrier rotatably holding the crankshaft on the other end side, a strut disposed between the base carrier and the end carrier so as to provide a connection between the base carrier and the end carrier, an output shaft fixed to the base carrier, an output pinion attached by spline coupling to the output shaft on the one end side, a fixing mechanism for fixing the pinion to the output shaft, and a pinion-side lubricating oil sealing mechanism for sealing lubricating oil in a spline coupling portion between the output shaft and the pinion, the mechanism including a sealing structure configured to provide sealing against a flow of the lubricating oil from the spline coupling portion.

According to this aspect of the present invention, the windmill pitch driving apparatus is configured as an eccentric speed reducer provided with the external tooth gears, which rotate eccentrically. Accordingly, a high speed reduction ratio is ensured, and improved output torque is achieved. The windmill pitch driving apparatus, which is configured as an eccentric speed reducer, is capable of achieving a high speed reduction ratio with a small configuration. In the windmill pitch driving apparatus according to this aspect of the present invention, the fixing mechanism is provided in order to fix the pinion to the output shaft, and the pinion-side lubricating oil sealing mechanism is provided, which includes the sealing structure for providing sealing against the flow of lubricating oil from the spline coupling portion. Accordingly, leakage of the lubricating oil supplied in the spline coupling portion is prevented, and lubrication in the spline coupling portion is ensured. This prevents the occurrence of fretting wear in the spline coupling portion and thereby suppresses the occurrence of damage to the output shaft and the pinion, thus improving the durability of the windmill pitch driving apparatus.

It is thus possible according to this aspect of the present invention to provide a windmill pitch driving apparatus that is capable of achieving improved durability as well as improved output torque and reduced size.

A windmill pitch driving apparatus according to a seventh aspect of the present invention is the windmill pitch driving apparatus according to the sixth aspect of the present invention, in which the pinion-side lubricating oil sealing mechanism further includes a one-end-side member disposed on the one end side with respect to the output shaft and the pinion and abutting on the pinion on the one end side, and a bolt configured to extend through the one-end-side member and to be threadedly engaged with an end of the output shaft on the one end side. The sealing structure includes a first seal member disposed between the output shaft and the one-end-side member so as to provide sealing against a flow of lubricating oil in a direction from the spline coupling portion on the one end side toward the bolt, and a second seal member disposed between the pinion and the one-end-side member so as to provide sealing against a flow of lubricating oil from the spline coupling portion on the one end side to an outer side in a radial direction of the output shaft that is perpendicular to an axial direction of the output shaft.

According to this aspect of the present invention, the one-end-side member, which abuts on the pinion, is attached on the one end side with respect to the output shaft and the pinion with the bolt, which is threadedly engaged with the output shaft. The first seal member disposed between the output shaft and the one-end-side member prevents the flow of lubricating oil from the spline coupling portion toward the bolt. Also, the second seal member disposed between the pinion and the one-end-side member prevents the flow of lubricating oil from the spline coupling portion to the outer side in the radial direction of the output shaft. Accordingly, the flow of lubricating oil from the spline coupling portion on the one end side can be efficiently prevented with a simple mechanism including the first seal member abutting on the output shaft, the second seal member abutting on the pinion, the one-end-side member abutting on the first and second seal members, and the bolt.

A windmill pitch driving apparatus according to an eighth aspect of the present invention is the windmill pitch driving apparatus according to the seventh aspect of the present invention, in which the fixing mechanism includes a positioning portion configured to position the pinion on the other end side with respect to the output shaft side, and a pressure-applying fixing portion configured to bias the pinion toward the output shaft in the axial direction of the output shaft from the one end side, the pressure-applying fixing portion being fixed to the output shaft while applying pressure to the pinion, the pressure-applying fixing portion includes a presser plate member provided as the one-end-side member and configured to bias the pinion on the one end side, and a fixing bolt provided as the bolt and configured to extend through the presser plate member and to be threadedly engaged with the output shaft on the one end side, a gap is formed between the end of the output shaft on the one end side and the presser plate member, and the fixing bolt is configured to be threadedly engaged with the output shaft so as to bias the pinion via the presser plate member and cause pressure on the pinion, the first seal member abuts on the end of the output shaft on the one end side and the presser plate member, and is disposed on an inner side with respect to the spline coupling portion in the radial direction of the output shaft, and the second seal member abuts on the pinion on the one end side and the presser plate member, and is disposed on an outer side with respect to the spline coupling portion in the radial direction of the output shaft.

According to this aspect of the present invention, the fixing mechanism for fixing the pinion to the output shaft is provided with the presser plate member and the fixing bolt, which constitute a pressure-applying fixing portion that biases the pinion from the one end side and is fixed to the output shaft while applying pressure to the pinion. Accordingly, the pinion is fixed in a constrained state while being strongly pressed toward the output shaft in the axial direction, and thereby even small amounts of displacement of the pinion with respect to the output shaft are suppressed. This makes vibrations or backlash of the pinion with respect to the output shaft less likely to occur even if the windmill pitch driving apparatus rotates around the main shaft portion together with the blade and thereby suppresses the occurrence of damage to the output shaft and the pinion, thus further improving the durability of the windmill pitch driving apparatus. In addition, according to this aspect of the present invention, the presser plate member is configured to also serve the function of the one-end-side member in this aspect of the present invention, and the fixing bolt is configured to also serve the function of the bolt in this aspect of the present invention. Accordingly, the pinion-side lubricating oil sealing mechanism can be efficiently configured so as to also serve as the pressure-applying fixing portion. This reduces the number of constituent members of the windmill pitch driving apparatus, which includes the pressure-applying fixing portion and the pinion-side lubricating oil sealing mechanism, and simplifies the configuration thereof.

A windmill pitch driving apparatus according to a ninth aspect of the present invention is the windmill pitch driving apparatus according to the eighth aspect of the present invention, in which a plurality of the fixing bolts are provided, and the first seal member is disposed on an outer side with respect to the plurality of the fixing bolts in the radial direction of the output shaft.

According to this aspect of the present invention, the first seal member, which abuts on the output shaft and the presser plate member and disposed on the inner side with respect to the spline coupling portion in the radial direction of the output shaft, is disposed on the outer side with respect to the plurality of fixing bolts in the radial direction of the output shaft. Accordingly, even if the pressure-applying fixing portion is provided with a plurality of fixing bolts, the lubricating-oil sealing function of the first seal member can be achieved by simply disposing a single seal member as the first seal member between the spline coupling portion and the plurality of fixing bolts in the radial direction of the output shaft. This reduces the number of constituent members of the pinion-side lubricating oil sealing mechanism and simplifies the configuration thereof.

A windmill pitch driving apparatus according to a tenth aspect of the present invention is the windmill pitch driving apparatus according to the seventh aspect of the present invention, in which the one-end-side member is a cover member that is disposed so as to abut on the end of the output shaft on the one end side in a recessed portion formed in an end of the pinion on the one end side, and that is disposed such that an outer circumference of the cover member is fitted in and abuts on an inner circumference of the recessed portion of the pinion on the one end side, the bolt is a tap bolt configured to extend through the cover member and to be threadedly engaged with the output shaft on the one end side so as to fix the cover member to the output shaft, the first seal member abuts on the end of the output shaft on the one end side and the cover member, and is disposed on an inner side with respect to the spline coupling portion in the radial direction of the output shaft, and the second seal member abuts on an inner circumference of the pinion on the one end side and the outer circumference of the cover member, and is disposed on an outer side with respect to the spline coupling portion in the radial direction of the output shaft.

According to this aspect of the present invention, the one-end-side member in this aspect of the present invention is provided as a cover member that is fitted in and abuts on the inner circumference of the recessed portion formed in the end of the pinion and also abuts on the end of the output shaft, and it is fixed to the output shaft with the tap bolt, which constitutes the bolt in this aspect of the present invention. The flow of lubricating oil from the spline coupling portion on the one end side is thus prevented by the output shaft, the pinion, the cover member, and the first and second seal members. Accordingly, the configuration for providing sealing against the flow of lubricating oil from the spline coupling portion on the one end side can be made compact and space-efficient by forming the recessed portion in the end of the pinion and further disposing the cover member so as to cover the recessed portion.

A windmill pitch driving apparatus according to an eleventh aspect of the present invention is the windmill pitch driving apparatus according to the sixth aspect of the present invention, in which the sealing structure includes a cover seal member that is formed in a cover shape to cover the end of the output shaft on the one end side, and an outer circumference of which is attached in intimate contact to an end of the pinion on the one end side.

According to this aspect of the present invention, the flow of lubricating oil from the spline coupling portion on the one end side is prevented by attaching the outer circumference of the cover seal member, which covers the end of the output shaft on the one end side, in intimate contact to the end of the pinion on the one end side. Accordingly, the flow of lubricating oil from the spline coupling portion on the one end side can be efficiently prevented by a single seal member, namely, the cover seal member, that is attached to the pinion and covers the end of the output shaft. This reduces the number of constituent members of the pinion-side lubricating oil sealing mechanism and simplifies the configuration thereof.

A windmill pitch driving apparatus according to a twelfth aspect of the present invention is the windmill pitch driving apparatus according to the eleventh aspect of the present invention, in which the outer circumference of the cover seal member, attached in intimate contact to the end of the pinion on the one end side, is fitted in an inner circumference of a recessed portion of the pinion on the one end side, the recessed portion being formed in an end of the pinion on the one end side.

According to this aspect of the present invention, the cover seal member is configured so as to be fitted in intimate contact with the inner circumference of the recessed portion formed in the end of the pinion. Accordingly, the cover seal member, which provides sealing against the flow of lubricating oil from the spline coupling portion on the one end side, can be made compact and space-efficient.

A windmill pitch driving apparatus according to a thirteenth aspect of the present invention is the windmill pitch driving apparatus according to the twelfth aspect of the present invention, in which a projecting raised portion extending circumferentially in a projecting shape is formed on one of the outer circumference of the cover seal member and the inner circumference of the pinion on the one end side, and a groove-like recessed portion extending circumferentially in a groove shape is formed on the other of the outer circumference of the cover seal member and the inner circumference of the pinion on the one end side, the groove-like recessed portion being configured to be engaged with the projecting raised portion, and the projecting raised portion and the groove-like recessed portion are fitted to and engaged with each other by temporary elastic deformation of the cover seal member.

According to this aspect of the present invention, a projecting raised portion is formed on one of the outer circumference of the cover seal member and the inner circumference of the pinion, and a groove-like recessed portion is formed in the other thereof. The projecting raised portion and the groove-like recessed portion are fitted to and engaged with each other by temporary elastic deformation of the cover seal member, and accordingly the cover seal member is attached in intimate contact to the inner circumference of the pinion on the one end side. Accordingly, the intimate attachment of the cover seal member to the pinion can be easily achieved with a simple configuration in which the projecting raised portion and the groove-like recessed portion, which are engaged with each other, are provided in the pinion and the elastically deformable cover seal member.

A windmill pitch driving apparatus according to a fourteenth invent aspect of the present invention on is the windmill pitch driving apparatus according to the twelfth aspect of the present invention, in which the fixing mechanism includes a positioning portion configured to position the pinion on the other end side with respect to the output shaft side, and a pressure-applying fixing portion configured to bias the pinion toward the output shaft in the axial direction of the output shaft from the one end side, the pressure-applying fixing portion being fixed to the output shaft while applying pressure to the pinion, the pressure-applying fixing portion being disposed on the other end side with respect to the cover seal member in the recessed portion and covered with the cover seal member together with the end of the output shaft on the one end side.

According to this aspect of the present invention, the fixing mechanism for fixing the pinion to the output shaft is provided with a pressure-applying fixing portion that biases the pinion from the one end side and is fixed to the output shaft while applying pressure to the pinion. This makes vibrations or backlash of the pinion with respect to the output shaft less likely to occur even if the windmill pitch driving apparatus rotates around the main shaft portion together with the blade and thereby suppresses the occurrence of damage to the output shaft and the pinion, thus further improving the durability of the windmill pitch driving apparatus. In addition, according to this aspect of the present invention, the pressure-applying fixing portion is disposed in the recessed portion of the pinion and covered on the one end side with the cover seal member together with the output shaft. Accordingly, the pressure-applying fixing portion and the cover seal member can be made compact and space-efficient by disposing the pressure-applying fixing portion in the recessed portion formed in the end of the pinion and further disposing the cover seal member so as to cover the pressure-applying fixing portion.

A windmill pitch driving apparatus according to a fifteenth aspect of the present invention is the windmill pitch driving apparatus according to the sixth aspect of the present invention, in which the sealing structure includes a third seal member disposed so as to abut on the output shaft and the pinion, a portion of an inwardly stepwise reduced diameter is formed on both the outer circumference of the output shaft and the inner circumference of the pinion on the one end side with respect to the spline coupling portion, the portions being slidably in contact with each other, and a groove portion is formed extending circumferentially in one of the portions of the stepwise reduced diameter of the output shaft and the pinion, and the third seal member is disposed in the groove portion.

According to this aspect of the present invention, a portion of an inwardly stepwise reduced diameter is provided in both the output shaft and the pinion on the one end side of the spline coupling portion, and a third seal member is disposed in a groove portion formed in one of those portions so as to abut on the output shaft and the pinion. Accordingly, the sealing structure for providing sealing against the flow of lubricating oil from the spline coupling portion on the one end side can be achieved with a single seal member disposed between the output shaft and the pinion. The flow of lubricating oil from the spline coupling portion on the one end side can thus efficiently be prevented by a single third seal member, which reduces the number of constituent members of the pinion-side lubricating oil sealing mechanism and simplifies the configuration thereof.

A windmill pitch driving apparatus according to a sixteenth aspect of the present invention is the windmill pitch driving apparatus according to one of the seventh aspect of the present invention, in which the fixing mechanism includes a positioning portion configured to position the pinion on the other end side with respect to the output shaft side, and a pressure-applying fixing portion configured to bias the pinion toward the output shaft in the axial direction of the output shaft from the one end side, the pressure-applying fixing portion being fixed to the output shaft while applying pressure to the pinion, the positioning portion being a positioning member that is formed separately from the pinion, and the sealing structure further includes a fourth seal member that is disposed between the pinion and the positioning portion so as to abut on the pinion and the positioning portion.

According to this aspect of the present invention, the fixing mechanism for fixing the pinion to the output shaft is provided with a positioning portion that is formed separately from the pinion and positions the pinion on the other end side with respect to the output shaft side, and a pressure-applying fixing portion that biases the pinion from the one end side and is fixed to the output shaft while applying pressure to the pinion. This makes vibrations or backlash of the pinion with respect to the output shaft less likely to occur even if the windmill pitch driving apparatus rotates around the main shaft portion together with the blade and thereby suppresses the occurrence of damage to the output shaft and the pinion, thus further improving the durability of the windmill pitch driving apparatus. In addition, according to this aspect of the present invention, the fourth seal member is disposed between the pinion and the positioning portion so as to abut on the pinion and the positioning portion. Accordingly, even if the positioning portion is formed separately from the pinion, the fourth seal member prevents the flow of lubricating oil from the spline coupling portion on the other end side to the outer side.

A windmill pitch driving apparatus according to a seventeenth aspect of the present invention is the windmill pitch driving apparatus according to the sixteenth aspect of the present invention, in which the fixing mechanism further includes a disc spring that is disposed around the output shaft between the pinion and the positioning portion.

According to this aspect of the present invention, the pressure-applying fixing portion biases the pinion toward the output shaft in the axial direction of the output shaft, and the pinion is biased toward the positioning portion via the disc spring disposed around the output shaft. Accordingly, backlash of the pinion with respect to the output shaft is efficiently absorbed in a state where pressure is always being ensured by elastic deformation of the disc spring disposed between the pinion and the positioning portion, and therefore the pinion is more strongly pressed toward the output shaft and fixed to the output shaft. Thus, the separate formation of the positioning portion from the pinion further suppresses the occurrence of vibrations or backlash of the pinion with respect to the output shaft, thus further improving the durability of the windmill pitch driving apparatus.

Effects of the Invention

It is thus possible according to the present invention to provide a windmill pitch driving apparatus that is capable of achieving improved durability as well as improved output torque and reduced size.

DESCRIPTION OF THE INVENTION

The following is a description of embodiments for carrying out the present invention with reference to the drawings. Embodiments of the present invention are widely applicable as a windmill pitch driving apparatus that can be provided in a windmill and used as a driving apparatus for controlling the pitch angle of a blade that is rotatably provided on a main shaft portion of the windmill.

First Embodiment

Figure 1:
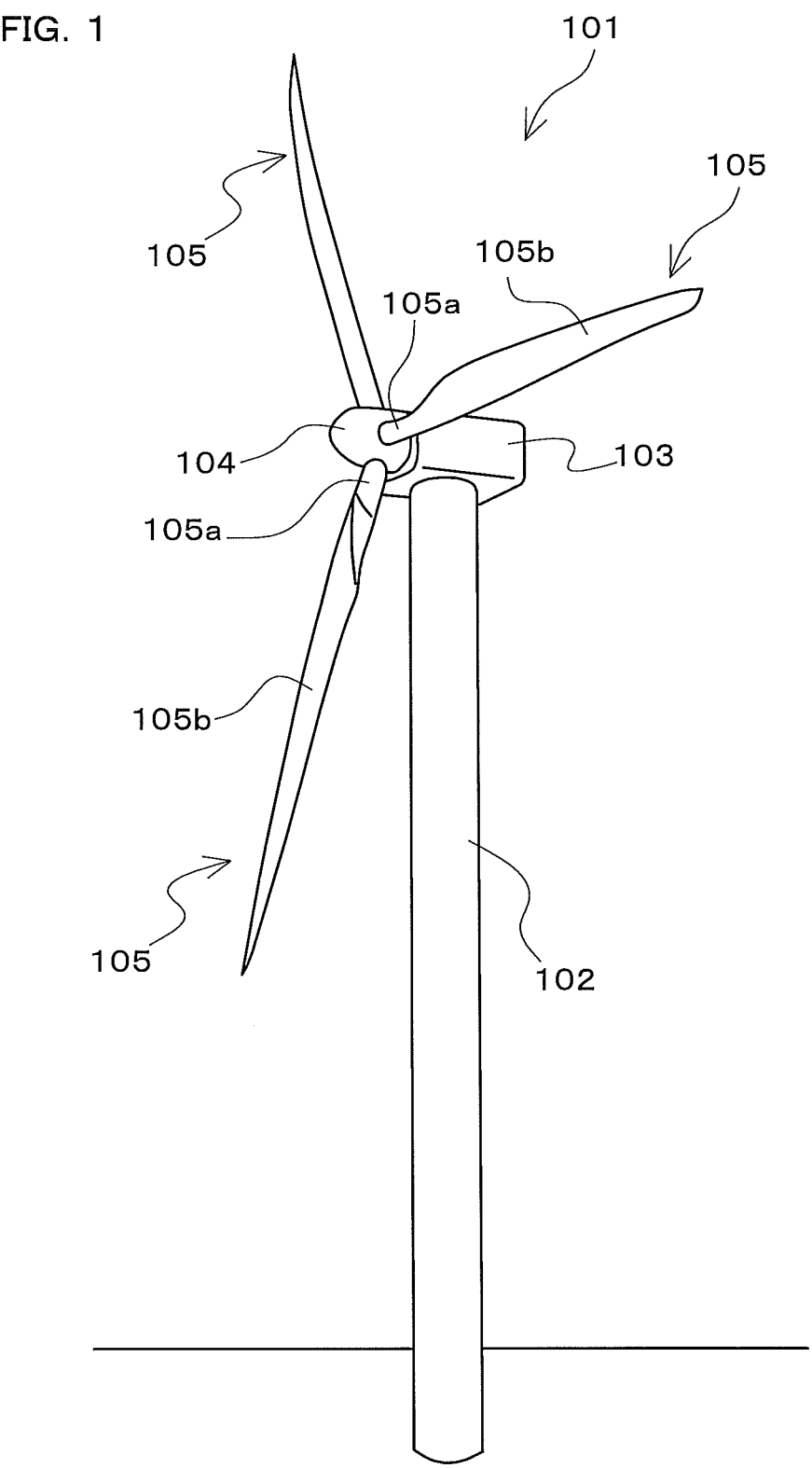
FIG. 1 is a perspective view of a windmill to which a windmill pitch driving apparatus according to a first embodiment of the present invention is applied.

FIG. 1 is a perspective view of a windmill 101 to which a windmill pitch driving apparatus 1 (hereinafter, simply referred to as a "pitch driving apparatus 1") according to a first embodiment of the present invention is applied. As shown in FIG. 1, the windmill 101 includes, for example, a tower 102, a nacelle 103, a hub (main shaft portion) 104, and blades 105. The tower 102 is installed so as to extend vertically upward from the ground. The nacelle 103 is rotatably disposed on the tower 102, such that it can be turned around in a horizontal plane by a yaw driving apparatus, which is not shown. A power transmission shaft, an electric power generator, and so on, not shown, are disposed inside the nacelle 103. The hub 104, which constitutes a main shaft portion in the present embodiment, is coupled to the aforementioned power transmission shaft and rotatably provided on the nacelle 103. Multiple (three, in the present embodiment) blades 105 are attached to the hub 104 so as to extend radially at equal angle intervals. Each blade 105 is configured by a hollow cylindrical shaft portion 105a that is attached to the hub 104, and a blade portion 105b for receiving wind.

Figure 2:
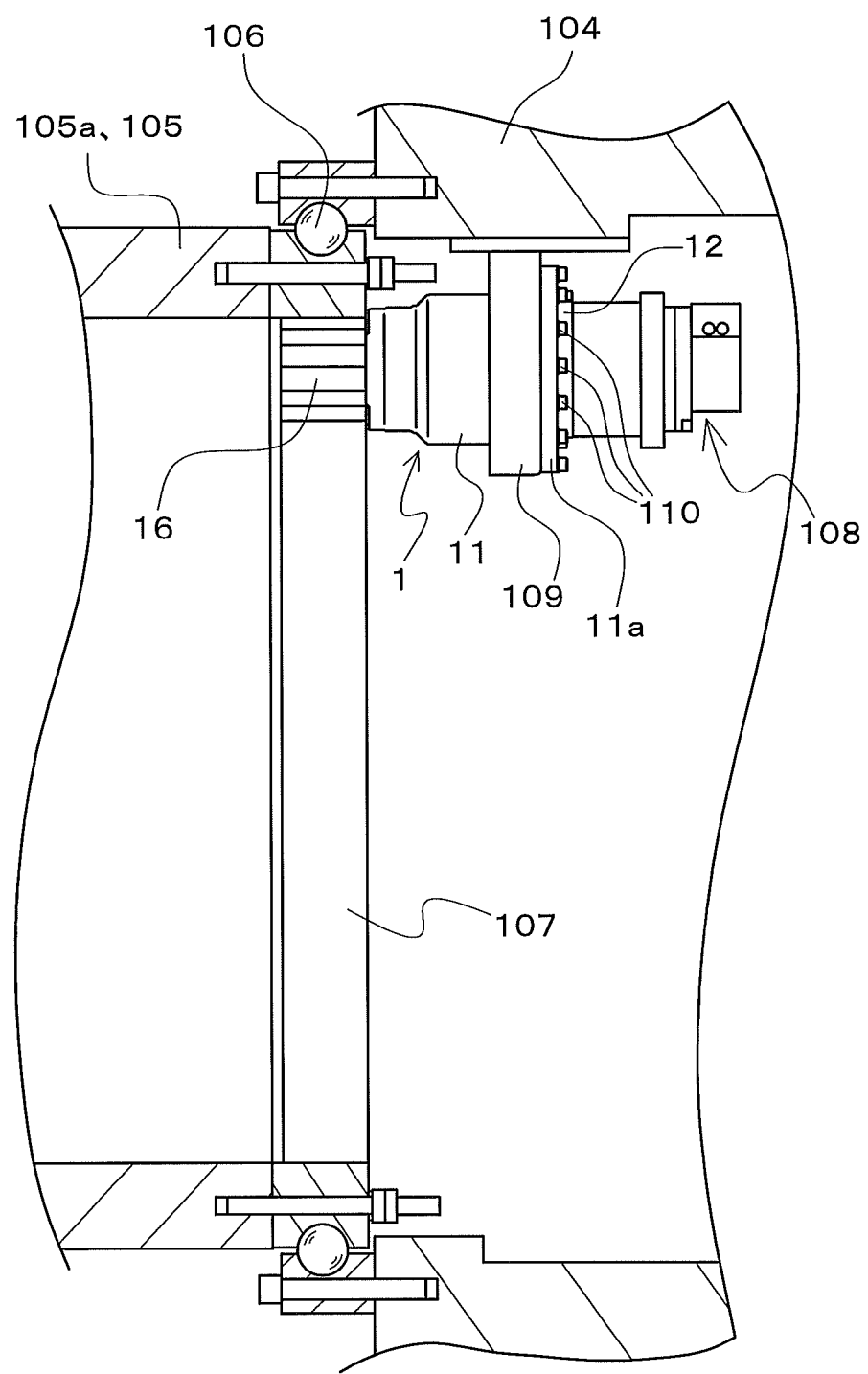
FIG. 2 is a cross-sectional view showing, in an enlarged scale, a portion where a blade is attached to the hub of the windmill shown in FIG. 1.

FIG. 2 is a cross-sectional view showing, in an enlarged scale, a portion where a blade 105 is attached to the hub 104, together with the pitch driving apparatus 1. The hub 104 has openings formed in portions to which the blades 105 are attached, and the blades 105 are disposed so as to face those openings at the ends of their shaft portions 105a. Each blade 105 is supported at its shaft portion 105a on the hub 104 via a bearing 106, and is rotatably provided on the hub 104. A ring gear 107 having internal teeth disposed on its inner circumferential side is provided at the end of the shaft portion 105a on the side attached to the hub 104 (in FIG. 2, the internal teeth of the ring gear 107 are not shown). The ring gear 107 is disposed such that its shaft center coincides with the shaft center of the shaft portion 105a, and configured so as to mesh with an output pinion 16 of the pitch driving apparatus 1, which will be discussed later.

Figure 3:
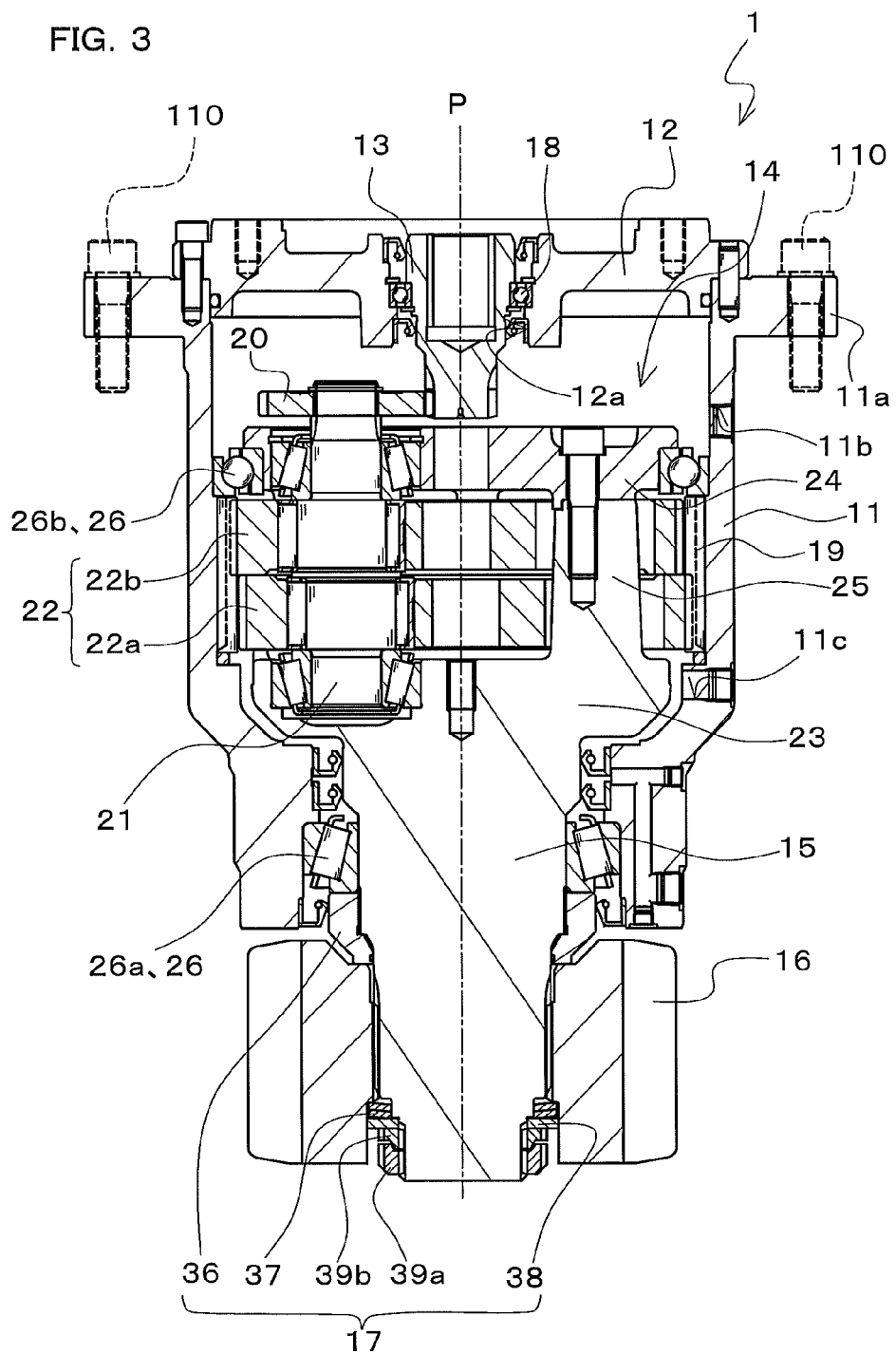
FIG. 3 is a cross-sectional view of the windmill pitch driving apparatus according to the first embodiment of the present invention.

FIG. 3 is a cross-sectional view of the pitch driving apparatus 1. The pitch driving apparatus 1 includes, for example, a casing 11, a cover 12, an input shaft 13, a speed reduction portion 14, an output shaft 15, the pinion 16, and a fixing mechanism 17. The pitch driving apparatus 1 is coupled to an electric motor 108 as shown in FIG. 2. The pitch driving apparatus 1 is attached via an attachment bracket 109 to the inside of an opening portion of the hub 104 to which a blade 105 is attached. Note that the pitch driving apparatus 1 is attached via multiple attachment bolts 110 to the attachment bracket 109 fixed to the hub 104, at a flange portion 11a formed on the casing 11. Also, the pitch driving apparatus 1 is disposed such that its axial direction, that is, the direction of an axis P of the output shaft 15 (the rotational center line of the pitch driving apparatus 1) indicated by the alternate long and short dashed line in FIG. 3, is parallel to the direction of the shaft center of the shaft portion 105a of the blade 105. As the pitch driving apparatus 1 is provided like this in the windmill 101, when the hub 104 rotates once, the pitch driving apparatus 1 rotates once around the shaft center of the hub 104 together with the blade 105, and accordingly the angle formed by the axis P of the output shaft 15 (hereinafter, simply referred to as the "axis P") relative to the vertical direction rotates through 360 degrees.

Furthermore, the pitch driving apparatus 1 is disposed such that the output pinion 16 disposed on one end side of the pitch driving apparatus 1 meshes with the ring gear 107 of the blade 105. The pitch driving apparatus 1 reduces the speed of the driving force input from the motor 108 disposed on the other end side of the pitch driving apparatus 1 and outputs the driving force to the pinion 16, thereby causing the blade 105 to rotate about its shaft center with respect to the hub 104, together with the ring gear 107 that meshes with the pinion 16. The pitch driving apparatus 1 is thereby configured to control the pitch angle of the blade 105. Note that in the following description, the output side of the pitch driving apparatus 1, on which the output shaft 15 is disposed, is referred to as "one end side", and the input side thereof, to which the motor 108 is attached, is referred to as "the other end side".

As shown in FIGS. 2 and 3, the casing 11 is formed in a cylindrical shape that is open on the one end side and on the other end side, and the aforementioned flange portion 11a for attachment to the attachment bracket 109 is formed on the other end side. Internal tooth pins 19 of the speed reduction portion 14, which will be discussed later, are disposed on the inner circumference of the casing 11. The casing 11 also has formed therein, for example, an oil supply port 11b for supplying lubricating oil to be enclosed in the casing 11 in the case of exchanging the lubricating oil in the casing 11, and an oil drain port 11c for draining the lubricating oil enclosed in the casing 11.

As shown in FIGS. 2 and 3, the cover 12 is provided as a disc-like member that is fixed with multiple bolts and pins to the casing 11 so as to cover the opening of the casing 11 on the other end side. The motor 108 is attached to the cover 12 on the other end side opposite the side attached to the casing 11. The cover 12 further has a through hole 12a formed in its central portion and through which the input shaft 13 discussed below extends.

As shown in FIG. 3, the input shaft 13 is provided as a short shaft member that extends through the through hole 12a of the cover 12 and receives the driving force of the motor 108, and is disposed on the axis P. Note that in the pitch driving apparatus 1, the input shaft 13, the speed reduction portion 14 disposed in the casing 11, and the output shaft 15 are disposed in series along the axis P. The input shaft 13 is coupled to an output shaft of the motor 108, not shown, on the other end side and has a gear portion formed on its outer circumference on the one end side. The input shaft 13 is rotatably held via a bearing 18 with respect to the through hole 12a of the casing 12. Note that a seal member is disposed between the cover 12 and the input shaft 13 so as to provide sealing in the through hole 12a against leakage of the lubricating oil enclosed in the casing 11 and the cover 12 to the outside.

Figure 4:
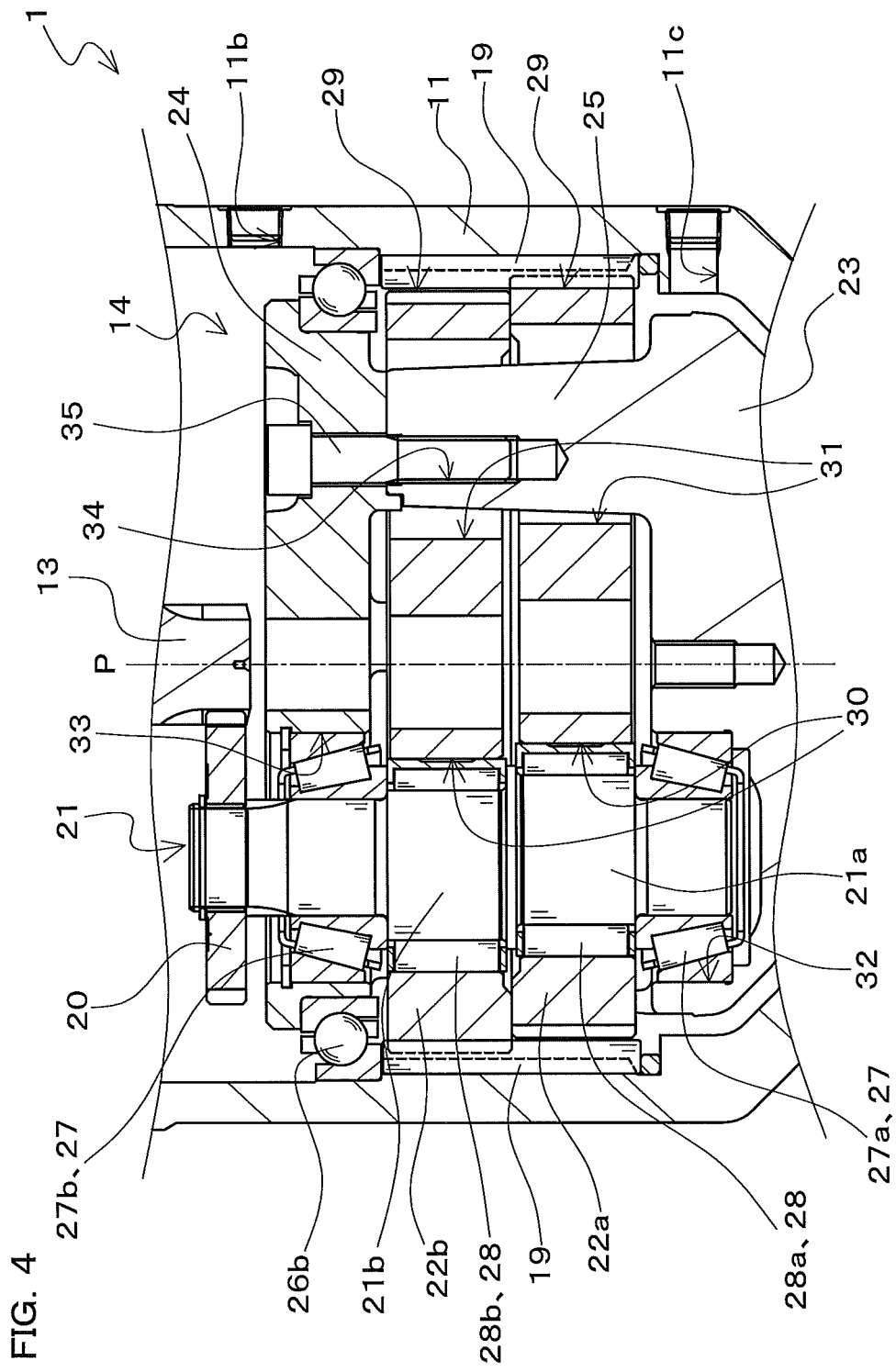
FIG. 4 is a cross-sectional view showing, in an enlarged scale, a speed reduction portion and its vicinity of the windmill pitch driving apparatus shown in FIG. 3.

FIG. 4 is a cross-sectional view showing, in an enlarged scale, the speed reduction portion 14 and its vicinity shown in FIG. 3. As shown in FIGS. 3 and 4, the speed reduction portion 14 includes, for example, the internal tooth pins 19, spur gears 20, crankshafts 21, external tooth gears 22, a base carrier 23, an end carrier 24, struts 25, main bearings 26, crankshaft bearings 27, and external tooth bearings 28.

Multiple internal tooth pins 19 are disposed on the inner circumference of the casing 11 in a state where they are fitted in and attached to pin grooves formed in the inner circumference of the casing 11. The internal tooth pins 19 (FIGS. 3 and 4 show their external shape, instead of the cross section) are formed as pin-like members (round bar-shaped members) and disposed such that their longitudinal direction is parallel to the axis P. The internal tooth pins 19 are circumferentially arranged at equal intervals on the inner circumference of the casing 11, and configured so as to mesh with external teeth 29 of the external tooth gears 22.

The spur gears 20 are disposed such that the direction of their shaft centers is parallel to the direction of the axis P, and are fixed to the ends of multiple crankshafts 21 provided on the other end side. The spur gears 20 are disposed so as to mesh with a gear portion of the input shaft 13 formed on the one end side, and configured to receive transmission of the driving force from the input shaft 13.

Multiple (three, for example) crankshafts 21 are disposed circumferentially around the axis P at equal angle intervals, such that their axial direction is parallel to the axis P. Each crankshaft 21 (FIGS. 3 and 4 show its external shape, instead of the cross section) is configured such that a spur gear 20 is fixed to its end on the other end side as described above and the driving force is input from the input shaft 13. The crankshafts 21 are disposed so as to extend through respective crank holes 30 formed in the external tooth gears 22, and are provided as shaft members that rotate with the driving force transmitted from the input shaft 13 and thereby let the external tooth gear 22 rotate eccentrically. The crankshafts 21 also move in an orbital manner along with the rotation of the external tooth gear 22 accompanied by their rotation (rotation on their own axis). Each crankshaft 21 has a first eccentric portion 21a and a second eccentric portion 21b formed in series in its middle portion. The first eccentric portion 21a and the second eccentric portion 21b are formed such that their cross section perpendicular to the axial direction is circular in shape, and provided such that their centers are eccentric with respect to the rotational center line of the crankshaft 21.

The crankshaft bearings 27 are provided as a pair of crankshaft bearings 27, one of which rotatably holds a crankshaft 21 on the one end side and the other of which rotatably holds the crankshaft 21 on the other end side. Each pair of crankshaft bearings 27 is composed of a crankshaft bearing 27a that rotatably holds a crankshaft 21 on the one end side with respect to the base carrier 23, which will be discussed later, and a crankshaft bearing 27b that rotatably holds the crankshaft 21 on the other end side with respect to the end carrier 24, which will be discussed later. In the present embodiment, both of the crankshaft bearings 27a and 27b are configured as tapered roller bearings.

The external tooth gears 22 include a first external tooth gear 22a and a second external tooth gear 22b that are housed in the casing 11 in parallel arrangement. As mentioned above, the first external tooth gear 22a and the second external tooth gear 22b have the crank holes 30 formed as circular holes, through which the crankshafts 21 extend. Each external tooth gear (22a, 22b) of the external tooth gears 22 further has formed therein, in addition to the crank holes 30, strut holes 31 through which the struts 25 discussed later extend. Note that the first external tooth gear 22a and the second external tooth gear 22b are disposed such that the positions of their crank holes 30 correspond to each other and the positions of their strut holes 31 correspond to each other, in the direction parallel to the axis P. Corresponding to the struts 25, multiple (three, for example) strut holes 31 are disposed circumferentially of the external tooth gears 22 at equal angle intervals.

The strut holes 31 and the crank holes 30 are alternately formed circumferentially of the external tooth gears 22. Note that the struts 25 extend through the strut holes 31 in a loosely fitted state without contact.

The external teeth 29 for meshing with the internal tooth pins 19 are provided on the outer circumference of each of the first external tooth gear 22a and the second external tooth gear 22b. The external teeth 29 of the first external tooth gear 22a and the external teeth 29 of the second external tooth gear 22b are provided such that their numbers are at least one smaller than the number of the internal tooth pins 19. Accordingly, with this configuration, the meshing of the external teeth 29 of the external tooth gears 22 (the first external tooth gear 22a and the second external tooth gear 22b) with the internal tooth pins 19 is shifted each time the crankshafts 21 rotate, and thereby the external tooth gears 22 (the first external tooth gear 22a and the second external tooth gear 22b) oscillate and rotate eccentrically.

The external tooth bearings 28 are provided as an external tooth bearing 28a disposed in the crank hole 30 of the first external tooth gear 22a, and as an external tooth bearing 28b disposed in the crank hole 30 of the second external tooth gear 22b. Both of the external tooth bearings 28 (28a and 28b) are configured as cylindrical roller bearings or needle roller bearings. In each crank hole 30, the external tooth bearing 28a rotatably holds the first eccentric portion 21a of the crankshaft 21 with respect to the first external tooth gear 22a, and the external tooth bearing 28b rotatably holds the second eccentric portion 21b of the crankshaft 21 with respect to the second external tooth gear 22b.

The base carrier 23 is integrally formed at its one end with the output shaft 15 and disposed in the casing 11. Meanwhile, crank holding holes 32 are formed in the base carrier 23 on the other end side. With the crank holding holes 32, the base carrier 23 rotatably holds the end of each crankshaft 21 on the one end side via the crankshaft bearings 27a. The crank holding holes 32 are circumferentially formed around the axis P at equal angle intervals.

The end carrier 24 is coupled to the base carrier 23 via the struts 25 and provided as a disc-shaped member. The end carrier 24 has crank holding holes 33 formed as through holes and provided circumferentially around the axis P at equal angle intervals. With the crank holding holes 33, the end carrier 24 rotatably holds the crankshafts 21 on the other end side via the crankshaft bearings 27b. Note that the axial position of the crankshaft bearings 27b on the other end side is defined under pressured conditions by a ring-shaped stopper that is fitted in the crank holding holes 33.

The struts 25 are disposed between the base carrier 23 and the end carrier 24 and provided as pillar-shaped members that provide a connection between the base carrier 23 and the end carrier 24. Multiple (three, for example) struts 25 are circumferentially disposed around the axis P at equal angle intervals, such that their axial direction is parallel to the axis P. Note that the struts 25 and the crankshafts 21 are alternatively disposed circumferentially around the axis P. Each strut 25 is integrally formed with the base carrier 23 and provided so as to project out from the base carrier 23 on the other end side. In each strut 25, a strut bolt hole 34 having an internal thread portion formed on its inner circumference is formed, opening on the other end side and facing a through hole for inserting a bolt formed in the end carrier 24. With this configuration, strut bolts 35 are inserted in the strut bolt holes 34 from the other end side with respect to the end carrier 24, and the external thread portions of the strut bolts 35 and the internal thread portions of the strut bolt holes 34 are threadedly engaged with one another, so the end carrier 24 and the base carrier 23 are coupled to each other via the struts 25.

The main bearings 26 are provided as a pair of main bearings 26 that rotatably holds the base carrier 23, the end carrier 24, and the output shaft 15 with respect to the casing 11. The pair of main bearings 26 includes a main bearing 26a that rotatably holds the output shaft 15 with respect to the casing 11, and a main bearing 2613 that rotatably holds the end carrier 24 with respect to the casing 11. In the present embodiment, the main bearing 26a is configured as a tapered roller bearing, and the main bearing 26b is configured as a ball bearing. Note that the main bearing 26a is engaged on the one end side with a positioning member 36 of the fixing mechanism 17, which will be discussed later, and is positioned on the other end side under pressured conditions in engagement with a stepped portion of the inner circumference of the casing 11. On the other hand, the main bearing 26b is engaged on the one end side with a stepped portion of the inner circumference of the casing 11, and is positioned on the other end side in engagement with an edge portion of the outer circumference of the end carrier 24. In the pitch driving apparatus 1, the positioning member 36, which will be described later, is attached to the output shaft 15, and the base carrier 23 and the end carrier 24 are fastened with the strut bolts 35 via the struts 25. Accordingly, the output shaft 15, the base carrier 23, and the end carrier 24 hold the casing 11 therebetween via the pair of main bearings 26, and the output shaft 15, the base carrier 23, and the end carrier 24 are rotatably held with respect to the casing 11.

As mentioned above, the output shaft 15 shown in FIG. 3 is integrally formed with the base carrier 23 on the other end side and is thereby fixed to the base carrier 23. A seal member is disposed between the outer circumference of the output shaft 15 and the inner circumference of the casing 11 and provides sealing against leakage of the lubricating oil in the casing 11 to the outside. The output pinion 16, which meshes with the ring gear 107 of the blade 105, is attached by spline coupling to the output shaft 15 on the one end side that is disposed so as to project out from the casing 11.

The fixing mechanism 17 shown in FIG. 3 is provided as a mechanism for fixing the pinion 16 to the output shaft 15, and includes the positioning member 36, disc springs 37, a washer 38, and multiple ring nuts (39a and 39b).

The positioning member 36 is formed as a ring-shaped member and disposed and attached on the outer circumference of the output shaft 15. The positioning member 36 on the other end side abuts on the main bearing 26a on the one end side that rotatably holds the output shaft 15 with respect to the casing 11, whereas the positioning member 36 on the one end side abuts on the pinion 16 on the other end side. Accordingly, the positioning member 36 constitutes a positioning portion in the present embodiment, which positions the pinion 16 on the other end side with respect to the output shaft 15 side.

The disc springs 37, the washer 38, and the multiple ring nuts (39a and 39b) are disposed around the output shaft 15 on the one end side with respect to the pinion 16. As illustrated in the present embodiment, multiple disc springs 37 are disposed, overlapping one another. The disc springs 37 are disposed so as to abut on the inner circumference side of the pinion 16 on the one end side, the pinion 16 being attached by spline coupling to the output shaft 15. The washer 38 is disposed on the one end side with respect to the disc springs 37, and the multiple ring nuts (39a and 39b) are disposed on the one end side with respect to the washer 38.

The multiple ring nuts (39a and 39b) include a ring nut 39b that abuts on the washer 38 in a direction parallel to the direction of the axis P, and a ring nut 39a that abuts on the ring nut 39b from the one end side, both of which are formed so as to be threadedly engaged with the outer circumference of the output shaft 15. Accordingly, the multiple ring nuts (39a and 39b) in threaded engagement with the output shaft 15 bias the pinion 16 toward the output shaft 15 in the direction of the axis P from the one end side to the other end side. The multiple ring nuts (39a and 39b) are then tightened so as to further bias the pinion 16 via the washer 38 and the disc springs 37, and are thereby fixed in threaded engagement to the output shaft 15 while applying pressure to the pinion 16. Accordingly, the multiple ring nuts (39a and 39b) constitute a pressure-applying fixing portion in the present embodiment.

Furthermore, a ring-shaped raised portion having an outer circumferential surface that forms part of a conical curved surface is formed on the outer circumferential portion of the ring nut 39b on the one end side. Meanwhile, a ring-shaped recessed portion having an inner circumferential surface that forms part of a conical curved surface is formed on the inner circumferential portion of the ring nut 39a on the other end side. The ring-shaped raised portion and the ring-shaped recessed portion are configured so as to abut on each other when the ring nut 39b and the ring nut 39a are disposed abutting on each other in threaded engagement with the outer circumference of the output shaft 15. Accordingly, the multiple ring nuts (39a and 39b) are disposed so as to abut on each other in a direction oblique to the direction of the axis P. This produces a strong tightening force due to the wedge effect between the ring-shaped raised portion and the ring-shaped recessed portion of the multiple ring nuts (39a and 39b) and thereby constrains rotational displacement of the ring nuts, thus achieving the effect of reliably preventing the loosening of the ring nuts (39a and 39b).

Next is a description of the operation of the above-described pitch driving apparatus 1 for controlling the pitch angle of the blade 105. The pitch driving apparatus 1 is actuated with the operation of the motor 108. When the operation of the motor 108 is started, the input shaft 13 rotates together with the output shaft of the motor 108 (not shown) and the spur gears 20 that mesh with the gear portion of the input shaft 13 rotate. When the spur gears 20 rotate, the crankshafts 21 fixed to the spur gears 20 rotate together with their first and second eccentric portions (21a and 21b). Accordingly, a load is applied from the first and second eccentric portions (21a and 21b) respectively to the first and second external tooth gears (22a and 22b), and the first and second external tooth gears (22a and 22b) oscillate and rotate eccentrically while shifting their meshing with the internal tooth pins 19. With the eccentric rotation of the first and second external tooth gears (22a and 22b), the crankshafts 21, which are rotatably held against the first and second external tooth gears (22a and 22b), orbit the axis P while rotating on their own axes. This orbital movement of the crankshafts 21 causes the output shaft 15 to rotate together with the base carrier 23 and the end carrier 24, which are coupled to each other via the struts 25 and rotatably hold the crankshafts 21 via the crankshaft bearings (27a and 27b), and therefore a high torque is output from the pinion 16. Accordingly, the ring gear 107 is driven by the pinion 16, and the pitch angle of the blade 105 is controlled.

Furthermore, as mentioned above, when the hub 104 rotates once, the pitch driving apparatus 1 rotates once around the shaft center of the hub 104 together with the blade 105, so the angle formed by the axis P of the pitch driving apparatus 1 relative to the vertical direction rotates through 360 degrees. Although the pinion 16 also rotates around the hub 104 together with the pitch driving apparatus 1, the occurrence of vibrations or backlash is prevented because the pinion 16 is firmly fixed to the output shaft 15 in a state in which pressure is applied to the pinion 16 by the fixing mechanism 17.

According to the windmill pitch driving apparatus 1 described above, the windmill pitch driving apparatus 1 is configured as an eccentric speed reducer provided with the external tooth gears 22, which rotate eccentrically. Accordingly, a high speed reduction ratio is ensured, and improved output torque is achieved. The pitch driving apparatus 1, which is configured as an eccentric speed reducer, is capable of achieving a high speed reduction ratio with a small configuration. Furthermore, in the windmill pitch driving apparatus 1, the fixing mechanism 17 for fixing the pinion 16 to the output shaft 15 is provided with the multiple ring nuts (39a and 39b), which constitute a pressure-applying fixing portion that biases the pinion 16 from the one end side and is fixed to the output shaft 15 while applying pressure to the pinion 16. Accordingly, the pinion 16 is fixed in a constrained state while being strongly pressed toward the output shaft 15 in the direction of the axis P, and thereby even very small amounts of displacement of the pinion 16 with respect to the output shaft 15 are suppressed. This makes vibrations or backlash of the pinion 16 with respect to the output shaft 15 less likely to occur even if the windmill pitch driving apparatus 1 rotates around the hub 104 together with the blade 105 and thereby suppresses the occurrence of damage to the output shaft 15 and the pinion 16, thus improving the durability of the windmill pitch driving apparatus 1. In addition, the driving efficiency of the windmill pitch driving apparatus 1 during operation can also be improved because the occurrence of vibrations or backlash is suppressed as described above.

It is thus possible according to the present embodiment to provide a windmill pitch driving apparatus 1 that is capable of achieving improved durability as well as improved output torque and reduced size.

Furthermore, according to the windmill pitch driving apparatus 1, the multiple ring nuts (39a and 39b), which are a pressure-applying fixing portion, bias the pinion 16 toward the output shaft 15 in the direction of the axis P via the disc springs 37 disposed around the output shaft 15. Accordingly, backlash of the pinion 16 with respect to the output shaft 15 is efficiently absorbed in a state where pressure is always being ensured by elastic deformation of the disc springs 37, and therefore the pinion 16 is more strongly pressed toward the output shaft 15 and fixed to the output shaft 15. This further suppresses the occurrence of vibrations or backlash of the pinion 16 with respect to the output shaft 15, thus further improving the durability of the windmill pitch driving apparatus 1.

Furthermore, according to the windmill pitch driving apparatus 1, the pressure-applying fixing portion is configured as the multiple ring nuts (39a and 39b), which are disposed so as to abut on each other and to be threadedly engaged with the output shaft 15. Accordingly, the pinion 16 can be more strongly pressed toward the output shaft 15 and fixed to the output shaft 15 with the biasing force of the multiple ring nuts (39a and 39b). In addition, the threaded engagement of the ring nuts (39a and 39b), abutting on each other, with the output shaft 15 constrains rotational displacement of the ring nuts (39a and 39b) and reliably prevents the loosening of the ring nuts. Accordingly, it is possible to permanently maintain the state in which the pinion 16 is under pressure and to thereby permanently suppress the occurrence of vibrations or backlash of the pinion 16 with respect to the output shaft 15.

Second Embodiment

Figure 5:
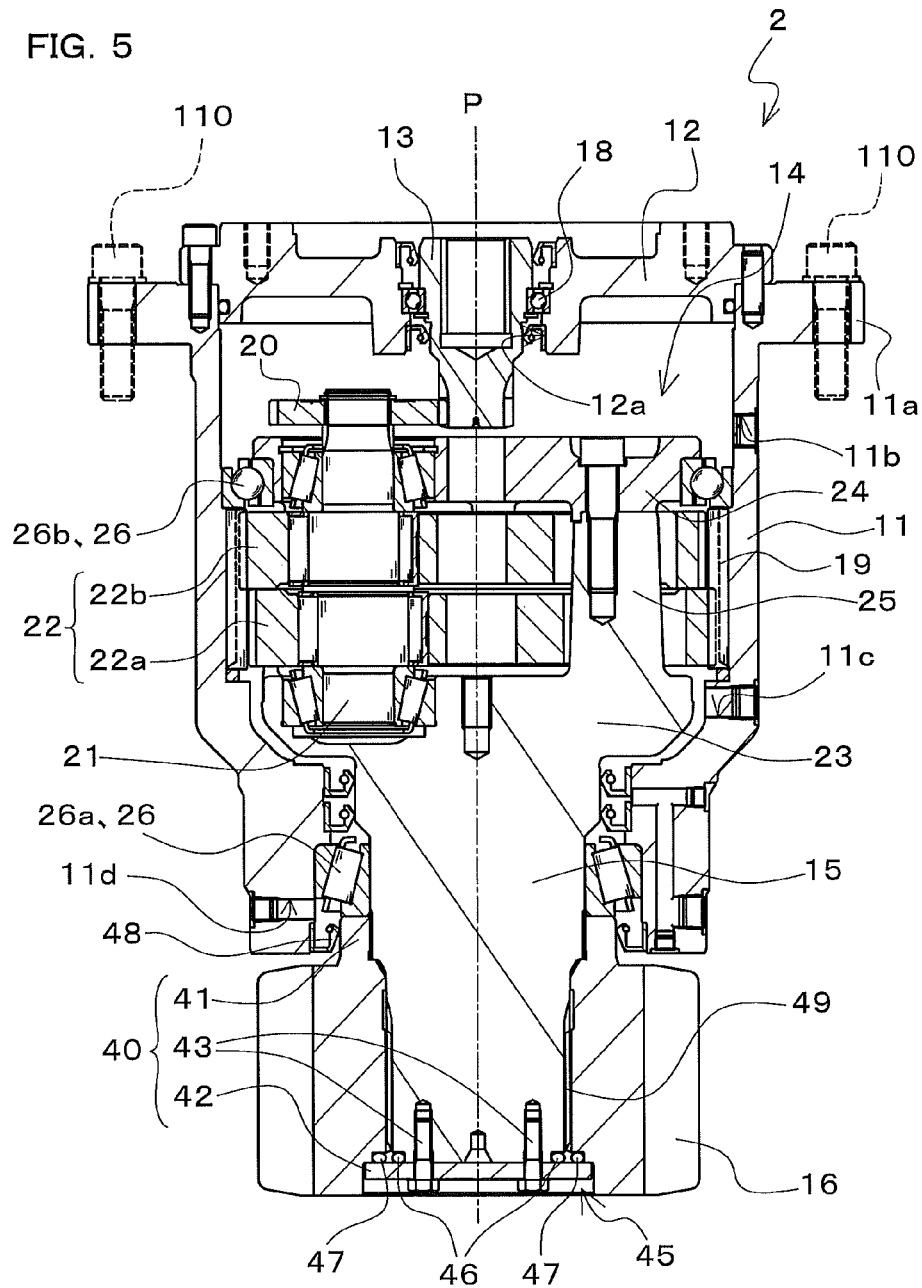
FIG. 5 is a cross-sectional view of a windmill pitch driving apparatus according to a second embodiment of the present invention.

Next is a description of a windmill pitch driving apparatus 2 (hereinafter, also referred to simply as a "pitch driving apparatus 2") according to a second embodiment of the present invention. FIG. 5 is a cross-sectional view of the pitch driving apparatus 2. Like the pitch driving apparatus 1 of the first embodiment, the pitch driving apparatus 2 is applied to the windmill 101 and used as a driving apparatus for controlling the pitch angle of a blade 105 that is rotatably provided on the hub 104. As shown in FIG. 5, like the pitch driving apparatus 1, the pitch driving apparatus 2 includes, for example, a casing 11, a cover 12, an input shaft 13, a speed reduction portion 14, an output shaft 15, a pinion 16, and a fixing mechanism 40. The second embodiment is different from the first embodiment in the configuration of the fixing mechanism 40 and in that a pinion-side lubricating oil sealing mechanism 45 is additionally provided in order to prevent leakage of lubricating oil from a spline coupling portion 49 between the output shaft 15 and the pinion 16 and seal the lubricating oil in the spline coupling portion 49. Hereinafter, constituent elements that are the same as those of the first embodiment have been given the same reference numerals in the drawings, and descriptions thereof have been omitted. The description of the pitch driving apparatus 2 focuses on the fixing mechanism 40 that is different in configuration from the first embodiment, and the pinion-side lubricating oil sealing mechanism 45 that is not provided in the first embodiment. In the following description, as in the first embodiment, the output side of the pitch driving apparatus 2, on which the output shaft 15 is disposed, is referred to as "one end side", and the input side thereof, to which the motor 108 is attached, is referred to as the "other end side".

As shown in FIG. 5, as in the first embodiment, the fixing mechanism 40 is configured as a mechanism for fixing the pinion 16 to the output shaft 15, the output shaft 15 being integrally formed with the base carrier 23 and projecting out from the casing 11, and the pinion 16 having been attached by spline coupling to the output shaft 15. This fixing mechanism 40 includes a positioning portion 41, a presser plate member 42, and fixing bolts 43.

The positioning portion 41 is integrally formed with the pinion 16 and provided so as to project in a ring shape toward the other end side on the other end side with respect to the pinion 16. The positioning portion 41 is disposed along the outer circumference of the output shaft 15 and abuts on the other end side on the main bearing 26a on the one end side, which rotatably holds the output shaft 15 with respect to the casing 11. Accordingly, the positioning portion 41 is configured to position the pinion 16 on the other end side with respect to the output shaft 15 side.

Figure 6:
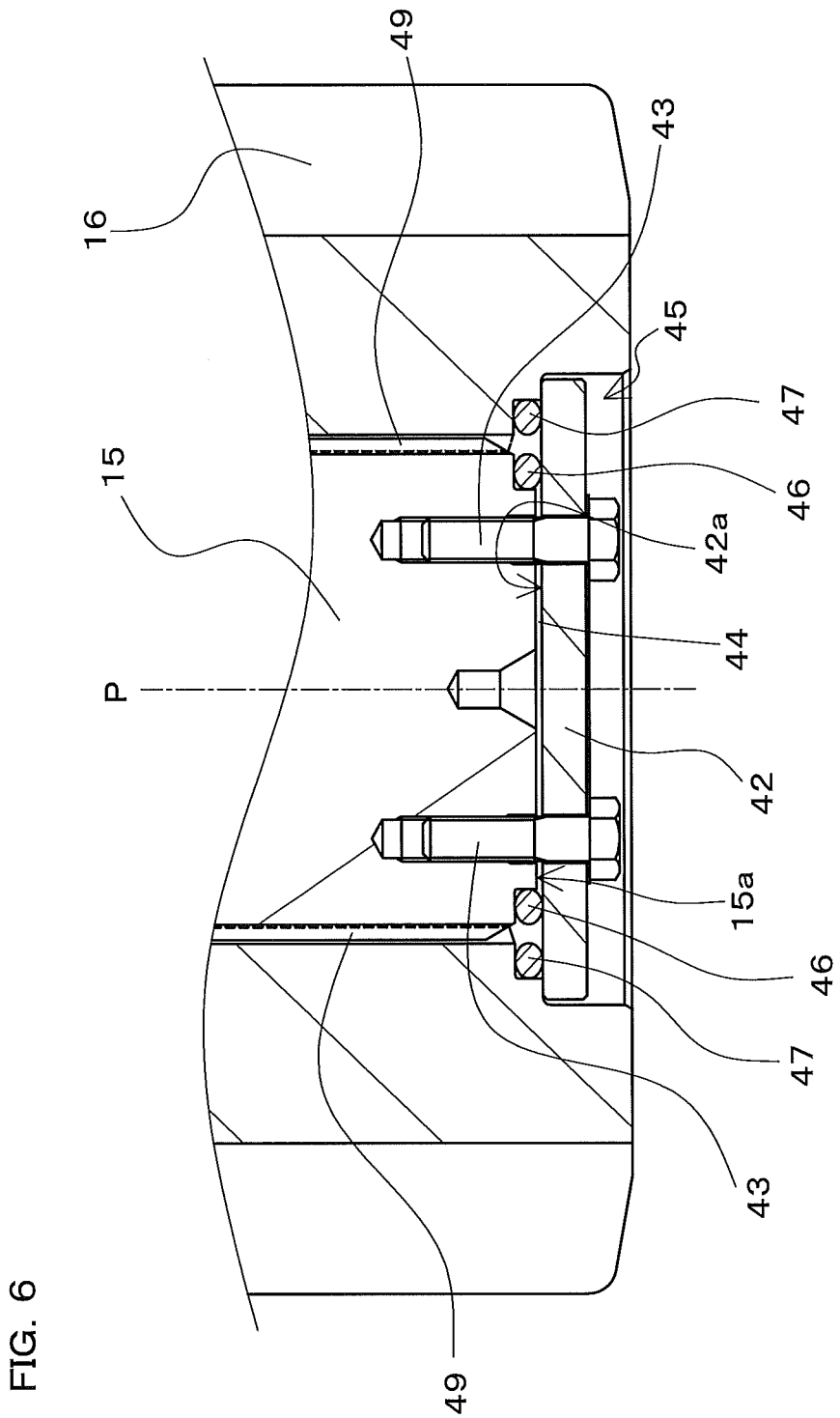
FIG. 6 is a cross-sectional view showing, in an enlarged scale, an output shaft and a pinion on one end side in the windmill pitch driving apparatus shown in FIG. 5.

The presser plate member 42 and the fixing bolts 43 are disposed on the one end side with respect to the output shaft 15 and the pinion 16. FIG. 6 is a cross-sectional view showing, in an enlarged scale, the output shaft 15 and the pinion 16 on the one end side shown in FIG. 5. As shown in FIGS. 5 and 6, the presser plate member 42 is formed in a disk shape having a larger diameter than an end face 15a of the end of the output shaft 15 on the one end side. The presser plate member 42 is disposed in a recessed portion formed in the end of the pinion 16 on the one end side, so as to face the end of the output shaft 15 and bias the pinion 16 on the one end side while abutting on the pinion 16 on the one end side. A gap 44 is formed between the end face 15a of the end of the output shaft 15 on the one end side and an output-shaft facing face 42a of the presser plate member 42 on the other end side. Also, multiple through holes, through which the fixing bolts 43 extend, are formed in the presser plate member 42. Note that a first seal member 46 and a second seal member 47, which will be discussed later, are disposed respectively between the presser plate member 42 and the output shaft 15 and between the presser plate member 42 and the pinion 16.

Multiple fixing bolts 43 are provided and configured so as to extend through the respective through holes of the presser plate member 42 and to be fixed to the output shaft 15 in threaded engagement with the end of the output shaft 15 on the one end side. The fixing bolts 43, which are in threaded engagement with the output shaft 15, bias the pinion 16 toward the output shaft 15 in the direction of the axis P from the one end side to the other end side via the presser plate member 42, which faces the end face 15a of the output shaft 15 with the gap 44 therebetween. Accordingly, the presser plate member 42 and the fixing bolts 43 are fixed to the output shaft 15 in a state in which the pinion 16 is under pressure. Thus, the presser plate member 42 and the fixing bolts 43 constitute a pressure-applying fixing portion in the present invention.

Furthermore, in the pitch driving apparatus 2, the grease supply port (lubricating oil supply port) 11d for supplying grease, which is lubricating oil, is formed on the one end side with respect to the casing 11 as shown in FIG. 5. With the grease supplied from the grease supply port 11d into the casing 11, lubrication is ensured in the main bearing 26a and in the spline coupling portion 49 between the output shaft 15 and the pinion 16. Note that a seal member 48 for preventing leakage of grease from the casing 11 on the one end side is disposed on the one end side with respect to the main bearing 26a and between the inner circumference of the end of the casing 11 on the other end side and the outer circumference of the positioning portion 41.

The pitch driving apparatus 2 is further provided with the pinion-side lubricating oil sealing mechanism 45 shown in FIGS. 5 and 6. The pinion-side lubricating oil sealing mechanism 45 is provided as a mechanism for preventing the grease (lubricating oil) supplied from the grease supply port 11d to the spline coupling portion 49 from leaking from the spline coupling portion 49 and for sealing the grease in the spline coupling portion 49. The pinion-side lubricating oil sealing mechanism 45 includes a sealing structure for providing sealing against the flow of grease from the spline coupling portion 49, the presser plate member 42, and the fixing bolts 43. Note that the presser plate member 42 and the fixing bolts 43 are constituent elements that overlap between the fixing mechanism 40 and the pinion-side lubricating oil sealing mechanism 45. The presser plate member 42 constitutes a one-end-side member of the pinion-side lubricating oil sealing mechanism 45 in the present embodiment. The fixing bolts 43 constitute the bolts of the pinion-side lubricating oil sealing mechanism 45 in the present embodiment.

The aforementioned sealing structure for providing sealing against the flow of grease from the spline coupling portion 49 includes the first seal member 46 and the second seal member 47. The first seal member 46 is provided as a ring-shaped rubber oil seal and fitted and attached in a stepped portion that is circumferentially formed so as to be recessed inwardly in the radial direction on the outer circumference of the end of the output shaft 15 on the one end side. The first seal member 46 abuts on the end of the output shaft 15 on the one end side and the presser plate member 42, and is disposed on the outer side with respect to the multiple fixing bolts 43 and on the inner side with respect to the spline coupling portion 49 in the radial direction of the pitch driving apparatus 2 (the direction perpendicular to the axis P). The first seal member 46 is disposed between the output shaft 15 and the presser plate member 42 so as to provide sealing against the flow of grease in the direction toward the fixing bolts 43 from the spline coupling portion 49 on the one end side. This prevents leakage of the grease from the spline coupling portion 49 via the through holes of the presser plate member 42, through which the fixing bolts 43 extend.

The second seal member 47 is provided as a ring-shaped rubber oil seal and fitted and attached in a stepped portion that is circumferentially formed so as to be recessed outwardly in the radial direction on the inner circumference of the pinion 16 on the one end side. The second seal member 47 abuts on the pinion 16 on the one end side and the presser plate member 42, and is disposed on the outer side with respect to the spline coupling portion 49 in the radial direction of the pitch driving apparatus 2. The second seal member 47 is disposed between the pinion 16 and the presser plate member 42 so as to provide sealing against the flow of grease from the spline coupling portion 49 on the one end side to the outer side in the radial direction of the pitch driving apparatus 2. This prevents leakage of the grease enclosed in the spline coupling portion 49 from between the pinion 16 and the presser plate member 42.

The pinion-side lubricating oil sealing mechanism 45 further includes, in addition to the first seal member 46 abutting on the output shaft 15 and the second seal member 47 abutting on the pinion 16, the presser plate member 42 that abuts on the first seal member 46 and the second seal member 47, and the fixing bolts 43. Accordingly, in the pinion-side lubricating oil sealing mechanism 45, the fixing bolts 43 bias the presser plate member 42 in threaded engagement with the output shaft 15, which lets the first seal member 46 and the second seal member 47 seal the spline coupling portion 49 on the one end side and thereby effectively prevents leakage of the grease from the spline coupling portion 49.

The above-described pitch driving apparatus 2 operates in the same manner as the pitch driving apparatus 1 of the first embodiment, and the pitch angle of the blade 105 is controlled by the operation of the pitch driving apparatus 2. When the hub 104 rotates, the pitch driving apparatus 2 rotates around the shaft center of the hub 104 together with the blade 105, and the pinion 16 rotates around the hub 104 as well. At this time, the occurrence of vibrations or backlash is prevented because the pinion 16 is firmly fixed to the output shaft 15 in a state in which pressure is applied to the pinion 16 by the fixing mechanism 40. Even if the pitch driving apparatus 2 rotates, the pinion-side lubricating oil sealing mechanism 45 seals the grease supplied in the spline coupling portion 49 and prevents leakage of the grease from the spline coupling portion 49. This ensures lubrication in the spline coupling portion 49 and prevents the occurrence of fretting wear in the spline coupling portion 49.

The above-described pitch driving apparatus 2, which is configured as an eccentric speed reducer, is capable of achieving improved output torque and reduced size. In addition, according to the pitch driving apparatus 2, the fixing mechanism 40 for fixing the pinion 16 to the output shaft 15 is provided with the presser plate member 42 and the fixing bolts 43, which constitute a pressure-applying fixing portion that biases the pinion 16 from the one end side and is fixed to the output shaft 15 while applying pressure to the pinion 16. Accordingly, the pinion 16 is fixed in a constrained state while being strongly pressed toward the output shaft 15 in the direction of the axis P, and thereby even very small amounts of displacement of the pinion 16 with respect to the output shaft 15 are suppressed. This makes vibrations or backlash of the pinion 16 with respect to the output shaft 15 less likely to occur even if the windmill pitch driving apparatus 2 rotates around the hub 104 together with the blade 105 and thereby suppresses the occurrence of damage to the output shaft 15 and the pinion 16, thus improving the durability of the windmill pitch driving apparatus 2. In addition, the driving efficiency of the windmill pitch driving apparatus 2 during operation can also be improved because the occurrence of vibrations or backlash is suppressed as described above.

It is thus possible according to the present embodiment to provide the windmill pitch driving apparatus 2 that is capable of achieving improved durability as well as improved output torque and reduced size.

Furthermore, according to the windmill pitch driving apparatus 2, the pressure-applying fixing portion can be easily configured at low cost by simply-structured members, namely, the presser plate member 42 and the fixing bolts 43. In addition, with the gap 44 formed between the output shaft 15 and the presser plate member 42, pressure can be easily caused on the pinion 16 by the threaded engagement of the fixing bolts 43 with the output shaft 15 via the presser plate member 42. It is thus possible according to the present embodiment to easily achieve, with a simple configuration, a windmill pitch driving apparatus 2 that is capable of achieving improved durability as well as improved output torque and reduce size.

Furthermore, according to the windmill pitch driving apparatus 2, the integral formation of the positioning portion 41 with the pinion 16 eliminates the need to manufacture the positioning portion as a separate member and further eliminates the need of extra assembly work for attaching the positioning portion to the output shaft 15. This reduces the number of constituent members and the number of assembly steps. In addition, according to the pitch driving apparatus 2, the attachment of the pinion 16 to the output shaft 15 allows the positioning portion 41, which is integrally formed with the pinion 16, to simultaneously support the main bearing 26a on the one end side. This further improves the efficiency of assembly work. It is thus possible according to the present embodiment to simplify the configuration of the windmill pitch driving apparatus 2, which is capable of achieving improved durability as well as improved output torque and reduced size, and to improve the efficiency of assembly work.

With the windmill pitch driving apparatus disclosed in PTL1, there is the problem that lubrication in the spline coupling portion between the output shaft and the pinion is not ensured, and accordingly fretting wear is likely to occur in the spline coupling portion due to repeated rotation of the windmill pitch driving apparatus. However, the windmill pitch driving apparatus 2 is provided with the pinion-side lubricating oil sealing mechanism 45 including the sealing structure, which includes the first seal member 46 and the second seal member 47 for sealing the spline coupling portion 49 on the one end side and provides sealing against the flow of grease from the spline coupling portion 49. Accordingly, leakage of the grease supplied in the spline coupling portion 49 is prevented, and lubrication in the spline coupling portion 49 is ensured with the grease. This prevents the occurrence of fretting wear in the spline coupling portion 49 and suppresses the occurrence of damage to the output shaft 15 and the pinion 16, thus further improving the durability of the windmill pitch driving apparatus.

Furthermore, according to the windmill pitch driving apparatus 2, the presser plate member 42, which is the one-end side member abutting on the pinion 16, is attached to the output shaft 15 and the pinion 16 on the one end side with the fixing bolts 43, which are the bolts threadedly engaged with the output shaft 15. In addition, the first seal member 46 disposed between the output shaft 15 and the presser plate member 42 prevents the flow of lubricating oil from the spline coupling portion 49 toward the fixing bolt 43. Also, the second seal member 47 disposed between the pinion 16 and the presser plate member 42 prevents the flow of lubricating oil from the spline coupling portion 49 to the outer side in the radial direction of the output shaft 15. Accordingly, the flow of lubricating oil from the spline coupling portion 49 on the one end side can be efficiently prevented with a simple mechanism including the first seal member 46 abutting on the output shaft 15, the second seal member 47 abutting on the pinion 16, the presser plate member 42 abutting on the first and second seal members (46 and 47), and the fixing bolts 43.

Furthermore, according to the windmill pitch driving apparatus 2, the presser plate member 42 of the pressure-applying fixing portion is configured to also serve the function of the one-end side member of the pinion-side lubricating oil sealing mechanism 45. Also, the fixing bolts 43 of the pressure-applying fixing portion are configured to also serve the function of the bolts of the pinion-side lubricating oil sealing mechanism 45. Thus, the pinion-side lubricating oil sealing mechanism 45 can be efficiently configured so as to also serve as the pressure-applying fixing portion. This reduces the number of constituent members of the windmill pitch driving apparatus 2, which includes the pressure-applying fixing portion and the pinion-side lubricating oil sealing mechanism 45, and simplifies the configuration thereof.

Furthermore, according to the windmill pitch driving apparatus 2, the first seal member 46, which abuts on the output shaft 15 and the presser plate member 42 and is disposed on the inner side with respect to the spline coupling portion 49 in the radial direction of the output shaft 15, is disposed on the outer side with respect to the multiple fixing bolts 43 in the radial direction of the output shaft 15. Accordingly, even if the pressure-applying fixing portion is provided with multiple fixing bolts 43, the lubricating-oil sealing function of the first seal member 46 can be achieved by simply disposing a single seal member as the first seal member 46 between the spline coupling portion 49 and the multiple fixing bolts 43 in the radial direction of the output shaft 15. This reduces the number of constituent members of the pinion-side lubricating oil sealing mechanism 45 and simplifies the configuration thereof.

Third Embodiment

Figure 7:
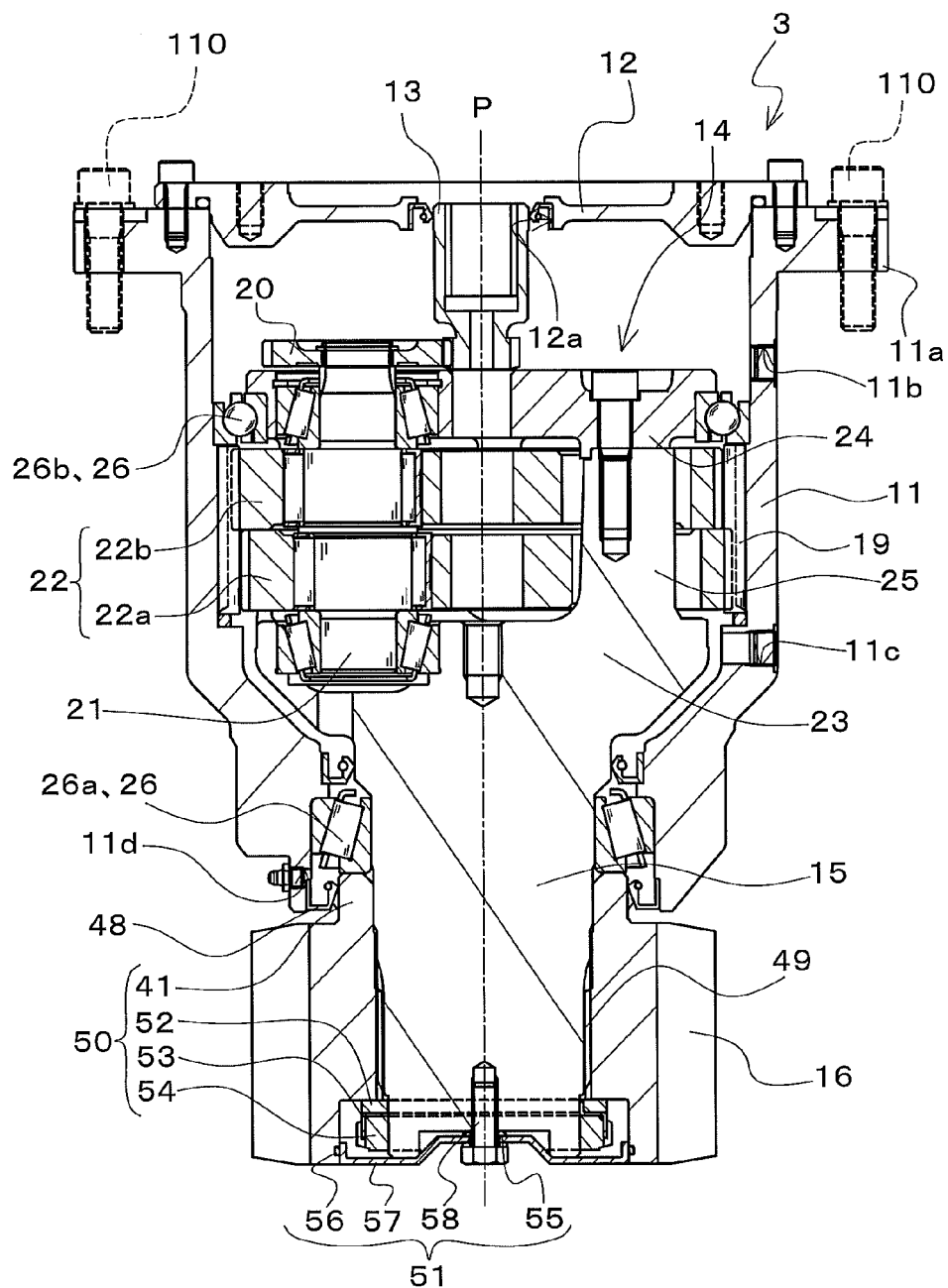
FIG. 7 is a cross-sectional view of a windmill pitch driving apparatus according to a third embodiment of the present invention.

Next is a description of a windmill pitch driving apparatus 3 (hereinafter, also referred to simply as a "pitch driving apparatus 3") according to a third embodiment of the present invention. FIG. 7 is a cross-sectional view of the pitch driving apparatus 3. Like the pitch driving apparatus 1 of the first embodiment, the pitch driving apparatus 3 is applied to the windmill 101 and used as a driving apparatus for controlling the pitch angle of a blade 105 that is rotationally provided on the hub 104. As shown in FIG. 7, like the pitch driving apparatus 1, the pitch driving apparatus 3 includes, for example, a casing 11, a cover 12, an input shaft 13, a speed reduction portion 14, an output shaft 15, a pinion 16, and a fixing mechanism 50. The third embodiment is different from the first embodiment in the configuration of the fixing mechanism 50 and in that a pinion-side lubricating oil sealing mechanism 51 is additionally provided in order to prevent leakage of lubricating oil from the spline coupling portion 49 between the output shaft 15 and the pinion 16 and seal the lubricating oil in the spline coupling portion 49.

Hereinafter, constituent elements that are the same as those of the first embodiment have been given the same reference numerals in the drawings, and descriptions thereof have been omitted. The description of the pitch driving apparatus 3 focuses on the fixing mechanism 50 that is different in configuration from the first embodiment and the pinion-side lubricating oil sealing mechanism 51 that is not provided in the first embodiment. Note that constituent elements of the pitch driving apparatus 3 that are the same as those of the second embodiment have also been given the same reference numerals in the drawings, and descriptions thereof have been omitted. In the following description, as in the first embodiment, the output side of the pitch driving apparatus 3, on which the output shaft 15 is disposed, is referred to as "one end side", and the input side thereof, to which the motor 108 is attached, is referred to as the "other end side".

As in the first embodiment, the fixing mechanism 50 shown in FIG. 7 is provided as a mechanism for fixing the pinion 16 to the output shaft 15, the output shaft 15 being integrally formed with the base carrier 23 and projecting out from the casing 11, and the pinion 16 having been attached by spline coupling to the output shaft 15. The fixing mechanism 50 includes the positioning portion 41, a plate member 52, a rotation stopper 53, and a ring nut 54. Note that, like the positioning portion 41 of the second embodiment, the positioning portion 41 is integrally formed with the pinion 16 and configured to abut on the main bearing 26a and to position the pinion 16 on the other end side with respect to the output shaft 15 side.

Figure 8:
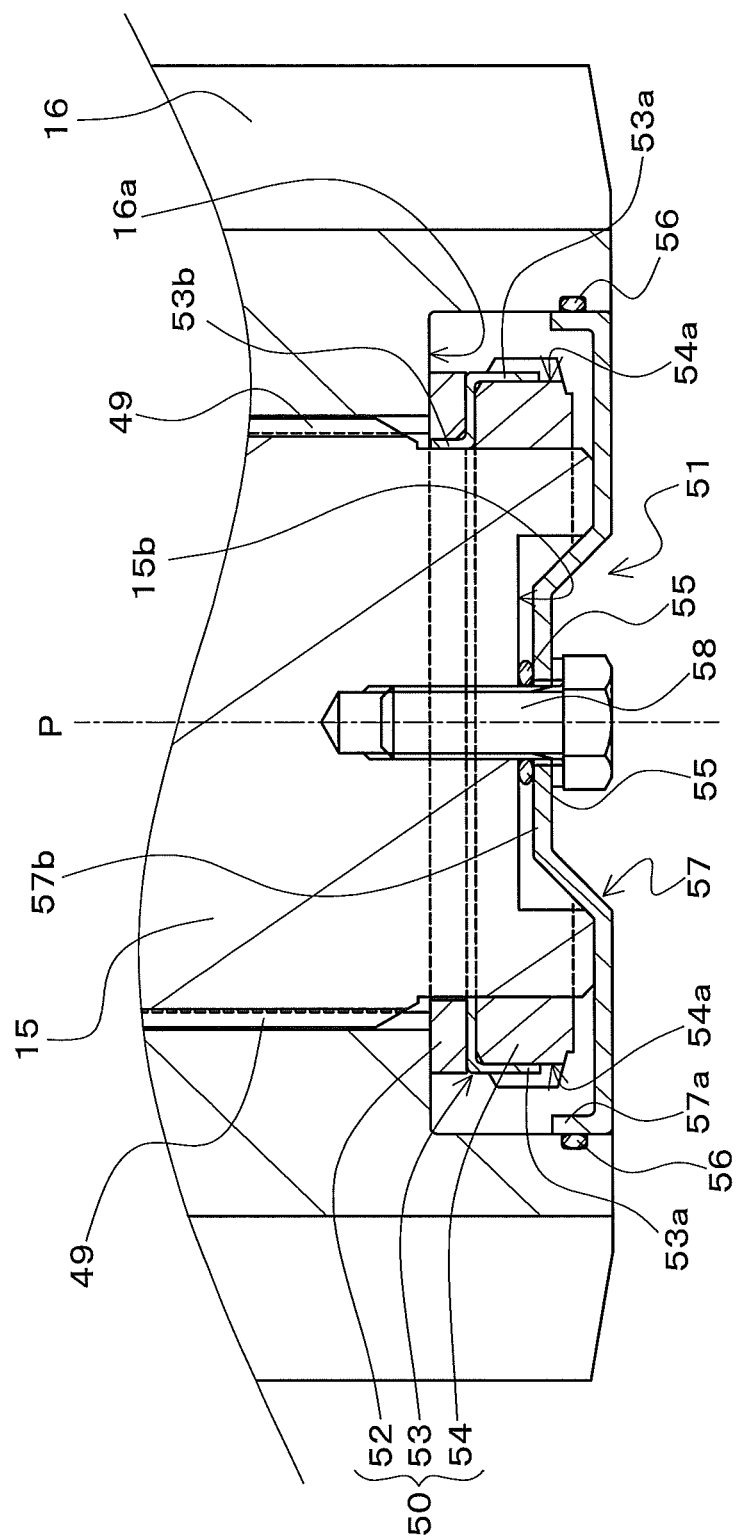
FIG. 8 is a cross-sectional view showing, in an enlarged scale, the output shaft and the pinion on one end side in the windmill pitch driving apparatus shown in FIG. 7.

FIG. 8 is a cross-sectional view showing, in an enlarged scale, the output shaft 15 and the pinion 16 on the one end side shown in FIG. 7. The plate member 52 shown in FIGS. 7 and 8 is formed in a ring shape having a through hole, through which the output shaft 15 extends on the one end side, formed in the center. With the output shaft 15 extending through its central through hole, the plate member 52 is disposed in a recessed portion 16a formed in the end of the pinion 16 on the one end side, such that the end face of the plate member 52 on the other end side abuts on the pinion 16. The rotation stopper 53 is disposed on the one end side with respect to the plate member 52, and the ring nut 54 is disposed on the one end side with respect to the rotation stopper 53.

The rotation stopper 53 is provided as a thin ring-shaped member that has a through hole, through which the output shaft 15 extends on the one end side, formed in the center and is engaged with the outer circumference of the ring nut 54, which will be discussed later, so as to serve the function of constraining rotational displacement of the ring nut 54 and thereby preventing the loosening of the ring nut 54. Multiple outer pawl portions 53a are circumferentially formed on the outer circumference of the rotation stopper 53, the outer pawl portions 53a being configured to be bent so as to be engaged with the outer circumference of the ring nut 54. Furthermore, inner pawl portions 53b are formed on the inner circumference of the rotation stopper 53, the inner pawl portions 53b being configured to be bent and inserted in the through hole of the plate member 52 so as to be engaged with groove-like portions formed in the inner circumference of the plate member 52.

The ring nut 54 has an internal thread portion formed in its inner circumference. The ring nut 54 is provided so as to be threadedly engaged with an external thread portion provided on the outer circumference of the end of the output shaft 15 on the one end side, in a state in which the rotation stopper 53 is disposed so as to abut on the plate member 52 while receiving the output shaft 15 through its central through hole and such that its inner pawl portions 53b are engaged with the inner circumference of the plate member 52. The ring nut 54 is threadedly engaged with the output shaft 15 so as to bias the pinion 16 toward the output shaft 15 in the direction of the axis P from the one end side toward the other end side. The ring nut 54 is then tightened so as to further bias the pinion 16 via the rotation stopper 53 and the plate member 52 and to be fixed in threaded engagement to the output shaft 15 while applying pressure to the pinion 16. Accordingly, the ring nut 54 constitutes a pressure-applying fixing portion in the present embodiment.

Furthermore, multiple groove-like recessed portions Ma are circumferentially formed extending in the axial direction on the outer circumference of the ring nut 54. The outer pawl portions 53a of the rotation stopper 53 are bent so as to be engaged with the recessed portions Ma. Accordingly, in a state in which the ring nut 54 applies pressure to the pinion 16 in threaded engagement with the output shaft 15, the rotation of the ring nut 54 in a direction in which the ring nut 54 is loosened is restricted by the rotation stopper 53. This engagement of the pawl portions 53a of the rotation stopper 53, which is tightened between the plate member 52 and the ring nut 54, with the recessed portions Ma prevents the rotation (loosening) of the ring nut 54.

Like the pinion-side lubricating oil sealing mechanism 45 of the second embodiment, the pinion-side lubricating oil sealing mechanism 51 shown in FIGS. 7 and 8 is provided as a mechanism for preventing the grease (lubricating oil) supplied from the grease supply port 11d to the spline coupling portion 49 from leaking from the spline coupling portion 49, and for sealing the grease in the spline coupling portion 49. The pinion-side lubricating oil sealing mechanism 51 includes a sealing structure for providing sealing against the flow of grease from the spline coupling portion 49, a cover member 57, and a tap bolt 58.

The cover member 57 is provided as a lid-like member that has a through hole, through which the tap bolt 58 extends, formed in the center and has an outer circumferential wall portion 57a formed extending along its entire outer circumference. The cover member 57 is disposed so as to abut on the end of the output shaft 15 on the one end side in the recessed portion 16a formed in the end of the pinion 16 on the one end side. Furthermore, the cover member 57 is disposed such that its outer circumferential wall portion 57a is fitted in and abuts on the inner circumference of the recessed portion 16a of the pinion 16 on the one end side. The cover member 57 also has a raised portion 57b formed in its central portion so as to rise toward the one end side (that is, so as to be recessed toward the other end side) in a state where the cover member 57 is disposed in the recessed portion 16a. With the cover member 57 disposed in the recessed portion 16a, the raised portion 57b is disposed so as to project toward the inside of a recessed portion 15b formed as a recess in the end of the output shaft 15 on the one end side, and to press a first seal member 55, which will be discussed later. Note that the cover member 57 constitutes a one-end-side member of the pinion-side lubricating oil sealing mechanism 51 in the present embodiment.

The tap bolt 58 is provided as a bolt member that extends through the central through hole of the cover member 57 and is threadedly engaged with an internal thread hole formed in the end of the output shaft 15 on the one end side so as to fix the cover member 57 to the output shaft 15. The tap bolt 58 is configured to be threadedly engaged with the output shaft 15 so that its bolt head presses the raised portion 57b of the cover member 57 from the one end side toward the other end side and thereby biases the cover member 57 toward the output shaft 15 via the first seal member 55. Note that the tap bolt 58 constitutes a bolt of the pinion-side lubricating oil sealing mechanism 51 in the present embodiment.

The sealing structure for providing sealing against the flow of grease from the spline coupling portion 49 includes the first seal member 55 and a second seal member 56. The first seal member 55 is provided as a ring-shaped rubber oil seal and disposed in the recessed portion 15b formed in the end of the output shaft 15 on the one end side. Furthermore, the first seal member 55 abuts on the end of the output shaft 15 on the one end side and the cover member 57 and is disposed on the outer side with respect to the tap bolt 58 and on the inner side with respect to the spline coupling portion 49 in the radial direction of the pitch driving apparatus 3 (the direction perpendicular to the axis P). The first seal member 55 is disposed between the output shaft 15 and the cover member 57 so as to provide sealing against the flow of grease in a direction from the spline coupling portion 49 on the one end side toward the tap bolt 58 via the recessed portion 16a. This prevents leakage of the grease in the spline coupling portion 49 and in the recessed portion 16a from the through hole of the cover member 57, through which the tap bolt 58 extends.

The second seal member 56 is provided as a ring-shaped rubber oil seal and fitted and attached to a groove portion that is formed extending circumferentially in the inner circumference of the recessed portion 16a of the pinion 16 formed on the one end side. Furthermore, the second seal member 56 abuts on the inner circumference of the pinion 16 on the one end side and the outer circumferential wall portion 57a of the cover member 57 and is disposed on the outer side with respect to the spline coupling portion 49 in the radial direction of the pitch driving apparatus 3. The second seal member 56 is disposed between the pinion 16 and the cover member 57 so as to provide sealing against the flow of grease from the spline coupling portion 49 on the one end side to the outer side via the recessed portion 16a in the radial direction of the pitch driving apparatus 3. This prevents leakage of the grease in the spline coupling portion 49 and in the recessed portion 16a from between the pinion 16 and the cover member 57.

In the pinion-side lubricating oil sealing mechanism 51, the tap bolt 58 is threadedly engaged with the output shaft 15 so as to bias the cover member 57, the cover member 57 thereby presses the first seal member 55 against the output shaft 15, and accordingly displacement of the cover member 57 is constrained, letting the outer circumferential wall portion 57a press the second seal member 56. Accordingly, the recessed portion 16a, which is the space on the one end side with respect to the spline coupling portion 49, is sealed with the first seal member 55 and the second seal member 56. This adequately prevents the leakage of grease from the spline coupling portion 49 via the recessed portion 16a.

The above-described pitch driving apparatus 3 operates in the same manner as the pitch driving apparatus 1 of the first embodiment, and the pitch angle of the blade 105 is controlled by the operation of the pitch driving apparatus 3. When the hub 104 rotates, the pitch driving apparatus 3 rotates around the shaft center of the hub 104 together with the blade 105, and the pinion 16 rotates around the hub 104 as well. At this time, the occurrence of vibrations or backlash is prevented because the pinion 16 is firmly fixed to the output shaft 15 in a state in which pressure is applied to the pinion 16 by the fixing mechanism 50. Furthermore, even if the pitch driving apparatus 3 rotates, the pinion-side lubricating oil sealing mechanism 51 seals the grease supplied in the spline coupling portion 49 and prevents leakage of the grease from the spline coupling portion 49. This ensures lubrication in the spline coupling portion 49 and prevents the occurrence of fretting wear in the spline coupling portion 49.

The above-described pitch driving apparatus 3, which is configured as an eccentric speed reducer, is capable of achieving improved output torque and reduced size. Furthermore, according to the pitch driving apparatus 3, the fixing mechanism 50 for fixing the pinion 16 to the output shaft 15 is provided with the ring nut 54, which is a pressure-applying fixing portion that biases the pinion 16 from the one end side and is fixed to the output shaft 15 while applying pressure to the pinion 16. Accordingly, the pinion 16 is fixed in a constrained state while being strongly pressed toward the output shaft 15 in the direction of the axis P, and therefore even very small amounts of displacement of the pinion 16 with respect to the output shaft 15 are suppressed. This makes vibrations or backlash of the pinion 16 with respect to the output shaft 15 less likely to occur even if the windmill pitch driving apparatus 3 rotates around the hub 104 together with the blade 105 and thereby suppresses the occurrence of damage to the output shaft 15 and the pinion 16, thus improving the durability of the windmill pitch driving apparatus 3. In addition, the driving efficiency of the windmill pitch driving apparatus 3 during operation can also be improved because the occurrence of vibrations or backlash is suppressed as described above.

It is thus possible according to the present embodiment to provide the windmill pitch driving apparatus 3 that is capable of achieving improved durability as well as improved output torque and reduced size.

The windmill pitch driving apparatus 3 is further provided with the pinion-side lubricating oil sealing mechanism 51 including the sealing structure, which includes the first seal member 55 and the second seal member 56 for sealing the spline coupling portion 49 on the one end side and provides sealing against the flow of grease from the spline coupling portion 49. Accordingly, leakage of the grease supplied in the spline coupling portion 49 is prevented, and lubrication in the spline coupling portion 49 is ensured with the grease. This prevents the occurrence of fretting wear in the spline coupling portion 49 and suppresses the occurrence of damage to the output shaft 15 and the pinion 16, thus further improving the durability of the windmill pitch driving apparatus 3.

Furthermore, according to the windmill pitch driving apparatus 3, the cover member 57, which is the one-end side member abutting on the pinion 16, is attached to the output shaft 15 and the pinion 16 on the one end side with the tap bolt 58, which is the bolt threadedly engaged with the output shaft 15. In addition, the first seal member 55 disposed between the output shaft 15 and the cover member 57 prevents the flow of lubricating oil from the spline coupling portion 49 toward the tap bolt 58. Also, the second seal member 56 disposed between the pinion 16 and the cover member 57 prevents the flow of lubricating oil from the spline coupling portion 49 to the outer side in the radial direction of the output shaft 15. Accordingly, the flow of lubricating oil from the spline coupling portion 49 on the one end side can be efficiently prevented with a simple mechanism including the first seal member 55 abutting on the output shaft 15, the second seal member 56 abutting on the pinion 16, the cover member 57 abutting on the first and second seal members (55 and 56), and the tap bolt 58.

Furthermore, according to the windmill pitch driving apparatus 3, the one-end-side member of the pinion-side lubricating oil sealing mechanism 51 is provided as the cover member 57, which is fitted in and abuts on the inner circumference of the recessed portion 16a formed in the end of the pinion 16 and abuts also on the end of the output shaft 15, and the one-end-side member is fixed to the output shaft 15 with the tap bolt 58, which constitutes the bolt of the pinion-side lubricating oil sealing mechanism 51. The flow of lubricating oil from the spline coupling portion 49 on the one end side is thus prevented by the output shaft 15, the pinion 16, the cover member 57, and the first and second seal members (55 and 56). Accordingly, the configuration for providing sealing against the flow of lubricating oil from the spline coupling portion 49 on the one end side can be made compact and space-efficient by forming the recessed portion 16a in the end of the pinion 16 and disposing the cover member 57 so as to cover the recessed portion 16a.

Fourth Embodiment

Figure 9:
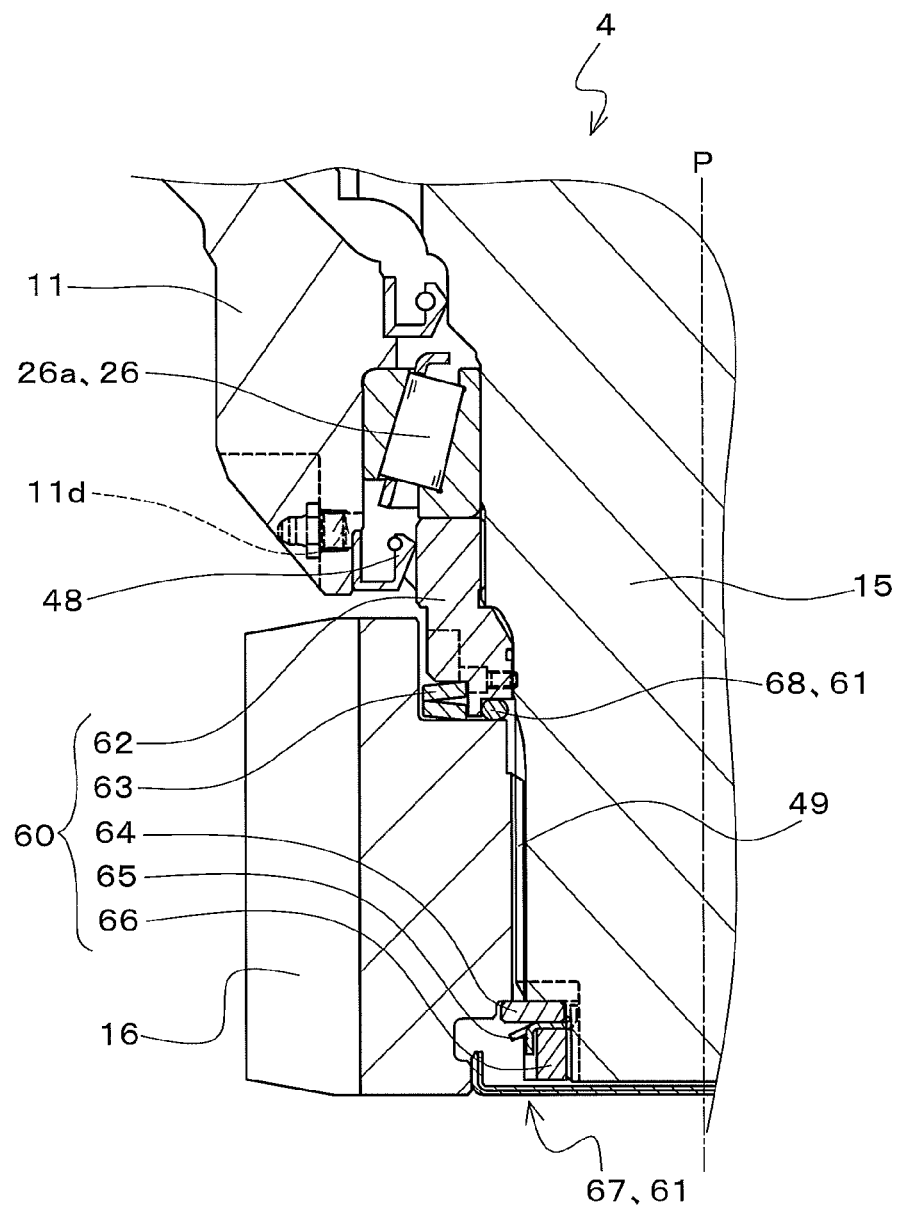
FIG. 9 is a cross-sectional view showing, in an enlarged scale, part of a cross section of a windmill pitch driving apparatus according to a fourth embodiment of the present invention.

Next is a description of a windmill pitch driving apparatus 4 (hereinafter, also referred to simply as a "pitch driving apparatus 4") according to a fourth embodiment of the present invention. FIG. 9 is a cross-sectional view showing, in an enlarged scale, part of a cross section of the pitch driving apparatus 4. Like the pitch driving apparatus 1 of the first embodiment, the pitch driving apparatus 4 is applied to the windmill 101 and used as a driving apparatus for controlling the pitch angle of a blade 105 that is rotationally provided on the hub 104. Like the pitch driving apparatus 1, the pitch driving apparatus 4 includes, for example, a casing 11, a cover 12, an input shaft 13, a speed reduction portion 14, an output shaft 15, a pinion 16, and a fixing mechanism 60. The fourth embodiment is different from the first embodiment in the configuration of the fixing mechanism 60 and in that a pinion-side lubricating oil sealing mechanism 61 is additionally provided in order to prevent leakage of lubricating oil from the spline coupling portion 49 between the output shaft 15 and the pinion 16 and seal the lubricating oil in the spline coupling portion 49. Note that FIG. 9 is a partial enlarged sectional view of the pitch driving apparatus 4, showing part of the output shaft 15 and the pinion 16 and its vicinity in an enlarged scale and not showing the input shaft 13 and the speed reduction portion 14.

Hereinafter, constituent elements that are the same as those of the first embodiment have been given the same reference numerals in the drawings, and descriptions thereof have been omitted. The description of the pitch driving apparatus 4 focuses on the fixing mechanism 60, which is different in configuration from the first embodiment, and the pinion-side lubricating oil sealing mechanism 61, which is not provided in the first embodiment. Note that constituent elements of the pitch driving apparatus 4 that are the same as those of the second and third embodiments have also been given the same reference numerals in the drawings, and descriptions thereof have been omitted. In the following description, as in the first embodiment, the output side of the pitch driving apparatus 4, on which the output shaft 15 is disposed, is referred to as "one end side", and the input side thereof to which the motor 108 not shown in FIG. 9 is attached, is referred to as the "other end side".

As in the first embodiment, the fixing mechanism 60 shown in FIG. 9 is provided as a mechanism for fixing the pinion 16 to the output shaft 15, the output shaft 15 being integrally formed with the base carrier 23 (not shown in FIG. 9) and projecting out from the casing 11, and the pinion 16 having been attached by spline coupling to the output shaft 15. The fixing mechanism 60 includes a positioning member 62, disc springs 63, a plate member 64, a rotation stopper 65, and a ring nut 66.

Like the positioning member 36 of the first embodiment, the positioning member 62 is formed as a ring-shaped member that is formed separately from the pinion 16 and disposed and attached on the outer circumference of the output shaft 15. The positioning member 62 on the one end side faces the pinion 16 on the other end side via the disc springs 63 and an O-ring seal 68, which will be discussed later, whereas the positioning member 62 on the other end side abuts on the main bearing 26a on the one end side, which rotatably holds the output shaft 15 with respect to the casing 11. Accordingly, the positioning member 62 constitutes a positioning portion in the present embodiment, which positions the pinion 16 on the other end side with respect to the output shaft 15 side.

The disc springs 63 are disposed around the output shaft 15 between the pinion 16 on the other side end and the positioning member 62 on the one end side. As illustrated in FIG. 9, multiple disc springs 63 are disposed overlapping one another, such that the one end side of the disc springs 63 abuts on the other end side of the pinion 16, and the disc springs 63 on the other end side abut on the positioning member 62 on the one end side. The disc springs 63 are also disposed on the outer side with respect to the O-ring seal 68 in the radial direction of the output shaft 15 (the direction perpendicular to the axis P of the output shaft 15).

Figure 10:
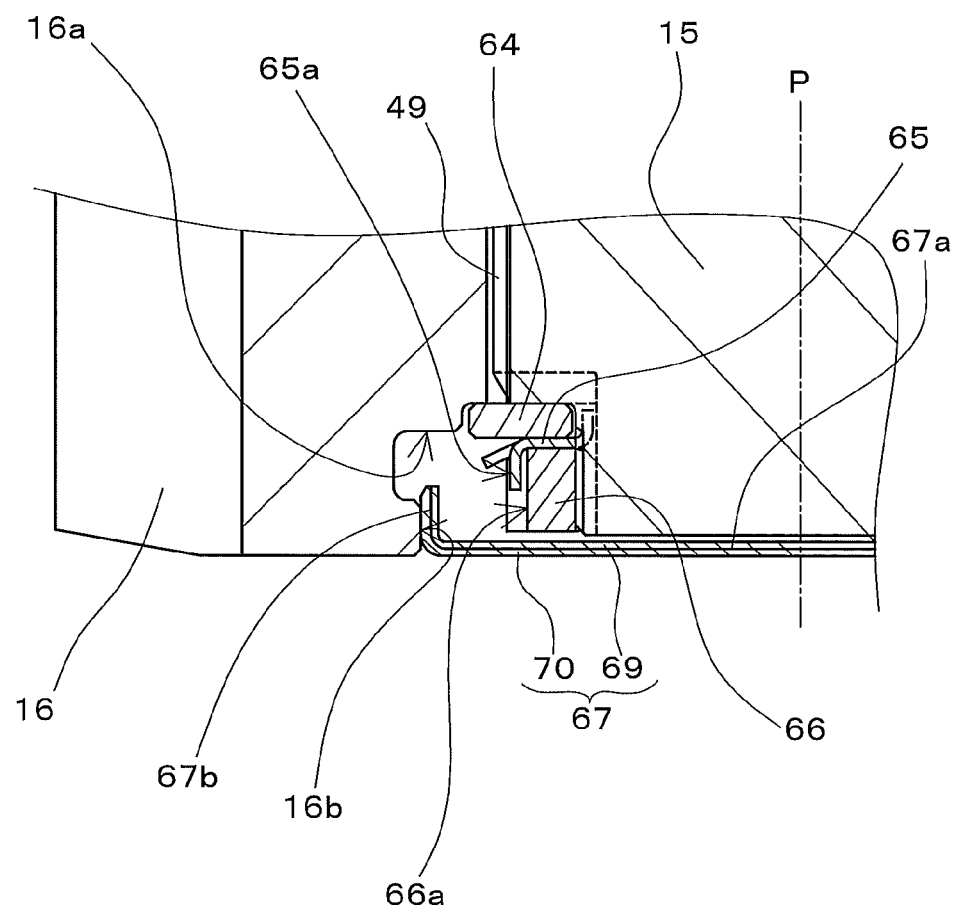
FIG. 10 is a cross-sectional view showing, in an enlarged scale, the output shaft and the pinion on one end side in the windmill pitch driving apparatus shown in FIG. 9.

FIG. 10 is a cross-sectional view showing, in an enlarged scale, the output shaft 15 and the pinion 16 on the one end side shown in FIG. 9. The plate member 64 shown in FIG. 9 and FIG. 10 is formed in a ring shape that has formed in the center a through hole, through which the output shaft 15 extends on the one end side. With the output shaft 15 extending through the central through hole of the plate member 64, the plate member 64 is disposed in the recessed portion 16a formed in the end of the pinion 16 on the one end side, such that the outer edge of the end face of the plate member 64 on the other end side abuts on the pinion 16. Note that the plate member 64 is disposed in the recessed portion 16a, abutting on the pinion 16 such that the plate member 64 is fitted in and supported by a stepped portion that is formed in the inner circumference side of the recessed portion 16a (on the inner side in the radial direction of the output shaft 15). The rotation stopper 65 is disposed on the one end side with respect to the plate member 64, and the ring nut 66 is disposed on the one end side with respect to the rotation stopper 65. In other words, the rotation stopper 65 is disposed between the plate member 64 and the ring nut 66 disposed on the one end side with respect to the plate member 64.

The rotation stopper 65 is provided as a thin ring-shaped member that has a through hole, through which the output shaft 15 extends on the one end side, formed in the center and is engaged with the outer circumference of the ring nut 66 in order to serve the function of constraining rotational displacement of the ring nut 66 and preventing the loosening of the ring nut 66. Multiple outer pawl portions 65a are circumferentially formed on the outer circumference of the rotation stopper 65, the outer pawl portions 65a being configured to be bent so as to be engaged with the outer circumference of the ring nut 66. Furthermore, inner pawl portions 53b (indicated by the broken line in FIGS. 9 and 10) are formed on the inner circumference of the rotation stopper 65, the inner pawl portions 53b being configured to be bent and inserted in the through hole of the plate member 64 so as to be engaged with a groove-like portion formed in the inner circumference of the plate member 64.

The ring nut 66 has an internal thread portion formed in its inner circumference. The ring nut 66 is provided so as to be threadedly engaged with an external thread portion formed on the outer circumference of the end of the output shaft 15 on the one end side. With the ring nut 66 being in threaded engagement with the output shaft 15, the rotation stopper 65 is disposed so as to abut on the plate member 64 while receiving the output shaft 15 through its central through hole, and such that the aforementioned inner pawl portions are engaged with the inner circumference of the plate member 64. The ring nut 66 is threadedly engaged with the output shaft 15 so as to bias the pinion 16 toward the output shaft 15 in the direction of the axis P from the one end side toward the other end side. The ring nut 66 is then tightened so as to further bias the pinion 16 via the rotation stopper 65 and the plate member 64 and to be fixed in threaded engagement to the output shaft 15 while applying pressure to the pinion 16. Accordingly, the ring nut 66 constitutes a pressure-applying fixing portion in the present embodiment.

Furthermore, multiple groove-like recessed portions 66a are circumferentially formed extending in the axial direction on the outer circumference of the ring nut 66. The outer pawl portions 65a of the rotation stopper 65 are bent so as to be engaged with the recessed portions 66a. Accordingly, in a state where the ring nut 66 applies pressure to the pinion 16 in threaded engagement with the output shaft 15, the rotation of the ring nut 66 in a direction in which the ring nut 66 is loosened is restricted by the rotation stopper 65. This engagement of the outer pawl portions 65a of the rotation stopper 65, which is tightened between the plate member 64 and the ring nut 66, with the recessed portions 66a prevents the rotation (loosening) of the ring nut 54.

Like the pinion-side lubricating oil sealing mechanisms (45 and 51) of the second and third embodiments, the pinion-side lubricating oil sealing mechanism 61 shown in FIG. 9 is provided as a mechanism for sealing grease (lubricating oil) in the spline coupling portion 49 between the output shaft 15 and the pinion 16. The pinion-side lubricating oil sealing mechanism 61 is thus configured so as to prevent the grease supplied from the grease supply port 11d to the spline coupling portion 49 from leaking from the spline coupling portion 49. The pinion-side lubricating oil sealing mechanism 61 includes a sealing structure for providing sealing against the flow of grease from the spline coupling portion 49.

As shown in FIGS. 9 and 10, the aforementioned sealing structure for providing sealing against the flow of grease from the spline coupling portion 49 includes a cover seal member 67 and the O-ring seal 68. The cover seal member 67 includes a flat plate portion 67a that is formed in the shape of a circular flat plate, and an outer circumferential wall portion 67b that extends along the entire outer circumference of the flat plate portion 67a and is formed as a cylindrical wall portion. The cover seal member 67 is formed like a cover shape to cover the end of the output shaft 15 on the one end side, and the outer circumference of its outer circumferential wall portion 67b is attached in intimate contact to the end of the pinion 16 on the one end side. Note that the cover seal member 67 is attached in intimate contact to the end of the pinion 16 on the one end side such that its outer circumferential wall portion 67b is fitted in an inner circumference 16b of the recessed portion 16a of the pinion 16 formed on the one end side. Such attachment of the cover seal member 67 to the end of the pinion 16 on the one end side prevents leakage of the grease in the spline coupling portion 49 and in the recessed portion 16a from between the outer circumference of the cover seal member 67 and the inner circumference 16b of the pinion 16 on the one end side.

The cover seal member 67 is configured as a multi-layer structure in which different kinds of multiple materials are bonded to one another into an integral unit. In the example shown in FIG. 10, the multi-layer structure of the cover seal member 67 includes a rigid layer 69 made of a highly rigid material such as a metal material, and an elastic layer 70 made of an elastically deformable material such as a resin material. The rigid layer 69 and the elastic layer 70 are each made of a material in which the flat plate portion 67a and the outer circumferential wall portion 67b are integrally formed with each other, and those layers are bonded to each other with an adhesive, for example. The elastic layer 70 is disposed on the one end side, which is the outer side with respect to the recessed portion 16a, and the rigid layer 69 is disposed on the other end side facing the end of the output shaft 15 on the one end side. With this configuration, elastic deformation of the outer circumferential wall portion 67b of the elastic layer 70 brings the cover seal member 67 into intimate contact with the inner circumference 16b of the pinion 16 on the one end side. Then, a load applied between the highly rigid layer 69 and the inner circumference 16b of the pinion 16 via the elastic layer 70 produces a sufficient amount of frictional force between the outer circumferential wall portion 67b and the inner circumference 16b of the pinion 16 and brings the outer circumferential wall portion 67b into intimate contact to the end of the pinion 16 on the one end side, which accordingly maintains a state in which the cover seal member 67 is attached to the end of the pinion 16 on the one end side.

With the cover seal member 67 disposed as described above, the ring nut 66, which is a pressure-applying fixing portion, is disposed in the recessed portion 16a on the other end side with respect to the cover seal member 67 and covered with the cover seal member 67 together with the end of the output shaft 15 on the one end side. In this way, the cover seal member 67 is formed as a cap-like member for sealing grease that constitutes a lid for covering the outer sides of the spline coupling portion 49, the pressure-applying fixing portion, and the end of the output shaft 15.

The O-ring seal 68 is provided as a ring-shaped rubber seal member and disposed around the output shaft 15. Furthermore, the O-ring seal 68 is disposed between the positioning member 62 on the one end side and the pinion 16 on the other end side so as to abut on the positioning member 62 and the pinion 16, thus constituting a fourth seal member in the present embodiment. Note that the outer circumferential side of the O-ring seal 68 is fitted in and supported by a stepped portion that is formed on the end of the positioning member 62 on the one end side so as to extend circumferentially and to be recessed inwardly, facing the outer circumference of the O-ring seal 68. The provision of the O-ring seal 68 provides sealing against the flow of grease from the spline coupling portion 49 on the other end side to the outside.

The above-described pitch driving apparatus 4 operates in the same manner as the pitch driving apparatus 1 of the first embodiment, and the pitch angle of the blade 105 is controlled by the operation of the pitch driving apparatus 4. When the hub 104 rotates, the pitch driving apparatus 4 rotates around the shaft center of the hub 104 together with the blade 105, and the pinion 16 rotates around the hub 104 as well. At this time, the occurrence of vibrations or backlash is prevented because the pinion 16 is firmly fixed to the output shaft 15 in a state in which pressure is applied to the pinion 16 by the fixing mechanism 60. Even if the pitch driving apparatus 4 rotates, the pinion-side lubricating oil sealing mechanism 61 seals the grease supplied in the spline coupling portion 49 and prevents leakage of the grease from the spline coupling portion 49.

The above-described pitch driving apparatus 4, which is configured as an eccentric speed reducer, is capable of achieving improved output torque and reduced size. Furthermore, in the windmill pitch driving apparatus 4, the fixing mechanism 60 is provided in order to fix the pinion 16 to the output shaft 15, and the pinion-side lubricating oil sealing mechanism 61 is provided, which includes a sealing structure for providing sealing against the flow of lubricating oil from the spline coupling portion 49. Accordingly, leakage of the grease supplied in the spline coupling portion 49 is prevented, and lubrication in the spline coupling portion 49 is ensured. This prevents the occurrence of fretting wear in the spline coupling portion 49 and suppresses the occurrence of damage to the output shaft 15 and the pinion 16, thus improving the durability of the windmill pitch driving apparatus 4.

It is thus possible according to the present embodiment to provide the windmill pitch driving apparatus 4 that is capable of achieving improved durability as well as improved output torque and reduced size.

Furthermore, according to the windmill pitch driving apparatus 4, the outer circumference of the cover seal member 67, which covers the end of the output shaft on the one end side, is attached in intimate contact to the end of the pinion 16 on the one end side, which prevents the flow of grease from the spline coupling portion 49 on the one end side. Accordingly, the flow of grease from the spline coupling portion 49 on the one end side can be efficiently prevented with a single seal member, namely the cover seal member 67, which is attached to the pinion 16 and covers the end of the output shaft 15. This reduces the number of constituent members of the pinion-side lubricating oil sealing mechanism 61 and simplifies the configuration thereof.

Furthermore, according to the windmill pitch driving apparatus 4, the cover seal member 67 is configured so as to be fitted in intimate contact with the inner circumference 16b of the recessed portion 16a formed in the end of the pinion 16. Accordingly, the cover seal member 67, which provides sealing against the flow of grease from the spline coupling portion 49 on the one end side, can be made compact and space-efficient.

Furthermore, according to the windmill pitch driving apparatus 4, the fixing mechanism 60 for fixing the pinion 16 to the output shaft 15 is provided with the ring nut 66, which is a pressure-applying fixing portion that biases the pinion 16 from the one end side and is fixed to the output shaft 15 while applying pressure to the pinion 16. This makes vibrations or backlash of the pinion 16 with respect to the output shaft 15 less likely to occur even if the windmill pitch driving apparatus 4 rotates around the hub 104 together with the blade 105 and thereby suppresses the occurrence of damage to the output shaft 15 and the pinion 16, thus improving the durability of the windmill pitch driving apparatus 4. In addition, according to the windmill pitch driving apparatus 4, the pressure-applying fixing portion is disposed in the recessed portion 16a of the pinion 16, and the one end side of the pressure-applying fixing portion is covered with the cover seal member 67 together with the output shaft 15. Accordingly, the pressure-applying fixing portion and the cover seal member 67 can be made compact and space-efficient by disposing the pressure-applying fixing portion in the recessed portion 16a formed in the end of the pinion 16 and further disposing the cover seal member 67 so as to cover the pressure-applying fixing portion.

Furthermore, according to the windmill pitch driving apparatus 4, the O-ring seal (fourth seal member) 68 is disposed between the pinion 16 and the positioning member 62, which is a positioning portion, so as to abut on the pinion 16 and the positioning member 62. Accordingly, even if the positioning portion is formed separately from the pinion 16 as the positioning member 62, the O-ring seal 68 provides sealing against the flow of grease from the spline coupling portion 49 on the other end side to the outside.

Furthermore, according to the windmill pitch driving apparatus 4, the ring nut 66, which is a pressure-applying fixing portion, biases the pinion 16 toward the output shaft 15 in the direction of the axis P, and accordingly the pinion 16 is biased toward the positioning member 62 via the disc springs 63 disposed around the output shaft 15. Accordingly, backlash of the pinion 16 with respect to the output shaft 15 is efficiently absorbed in a state where pressure is always being ensured by elastic deformation of the disc springs 63 disposed between the pinion 16 and the positioning member 62, and therefore the pinion 16 is more strongly pressed toward the output shaft 15 and fixed to the output shaft 15. Thus, the separate formation of the positioning portion from the pinion 16 as the positioning member 62 further suppresses the occurrence of vibrations or backlash of the pinion 16 with respect to the output shaft 15, thus further improving the durability of the windmill pitch driving apparatus 4.

Fifth Embodiment

Figure 11:
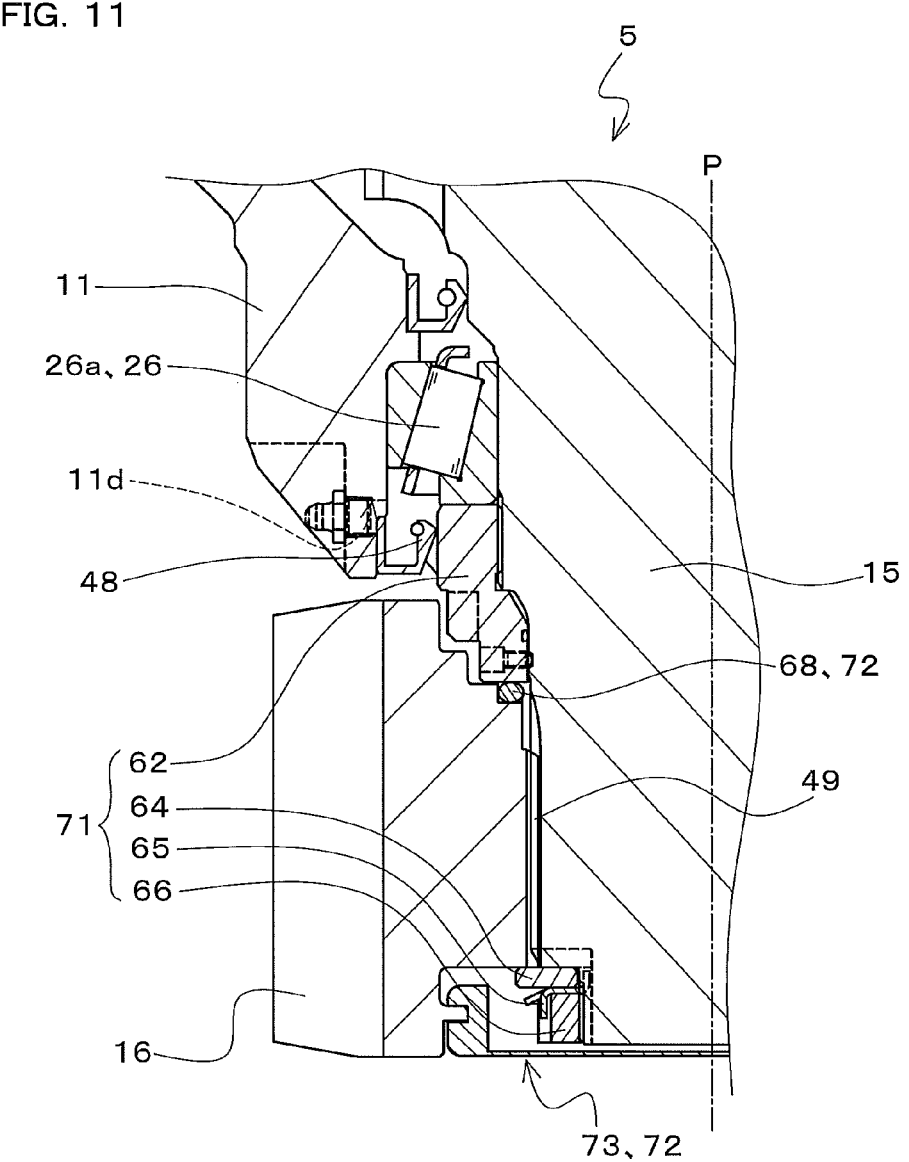
FIG. 11 is a cross-sectional view showing, in an enlarged scale, part of a cross section of a windmill pitch driving apparatus according to a fifth embodiment of the present invention.

Next is a description of a windmill pitch driving apparatus 5 (hereinafter, also referred to simply as a "pitch driving apparatus 5") according to a fifth embodiment of the present invention. FIG. 11 is a cross-sectional view showing, in an enlarged scale, part of a cross section of the pitch driving apparatus 5. Like the pitch driving apparatus 1 of the first embodiment, the pitch driving apparatus 5 is applied to the windmill 101 and used as a driving apparatus for controlling the pitch angle of a blade 105 that is rotationally provided on the hub 104. Like the pitch driving apparatus 1, the pitch driving apparatus 5 includes, for example, a casing 11, a cover 12, an input shaft 13, a speed reduction portion 14, an output shaft 15, a pinion 16, and a fixing mechanism 71. The fifth embodiment is different from the first embodiment in the configuration of the fixing mechanism 71 and in that a pinion-side lubricating oil sealing mechanism 72 is additionally provided in order to prevent leakage of lubricating oil from the spline coupling portion 49 between the output shaft 15 and the pinion 16 and seal the lubricating oil in the spline coupling portion 49. Note that FIG. 11 is a partial enlarged sectional view of the pitch driving apparatus 5, showing part of the output shaft 15 and the pinion 16 and its vicinity in an enlarged scale and not showing the input shaft 13 and the speed reduction portion 14.

Hereinafter, constituent elements that are the same as those of the first embodiment have been given the same reference numerals in the drawings, and descriptions thereof have been omitted. The description of the pitch driving apparatus 5 focuses on the fixing mechanism 71 that is different in configuration from the first embodiment and the pinion-side lubricating oil sealing mechanism 72 that is not provided in the first embodiment. Note that constituent elements of the pitch driving apparatus 5 that are the same as those of the second to fourth embodiments have also been given the same reference numerals in the drawings, and descriptions thereof have been omitted. In the following description, as in the first embodiment, the output side of the pitch driving apparatus 5, on which the output shaft 15 is disposed, is referred to as "one end side", and the input side thereof, to which the motor 108 not shown in FIG. 11 is attached, is referred to as the "other end side".

As in the first embodiment, the fixing mechanism 71 shown in FIG. 11 is provided as a mechanism for fixing the pinion 16 to the output shaft 15, the output shaft 15 being integrally formed with the base carrier 23 (not shown in FIG. 11) and projecting out from the casing 11, and the pinion 16 having been attached by spline coupling to the output shaft 15. Like the fixing mechanism 60 of the fourth embodiment, the fixing mechanism 71 includes the positioning member 62, the plate member 64, the rotation stopper 65, and the ring nut 66. The fixing mechanism 71 is different from the fixing mechanism 60 of the fourth embodiment in that the disc springs 63 are not provided. Accordingly, in the fixing mechanism 71, the positioning member 62 is disposed such that the positioning member 62 on the one end side abuts on the pinion 16 on the other end side. Note that the plate member 64, the rotation stopper 65, and the ring nut 66 of the fixing mechanism 71 have the same configuration as those of the fixing mechanism 60 of the fourth embodiment, and therefore descriptions thereof have been omitted.

Like the pinion-side lubricating oil sealing mechanisms (45, 51 and 61) of the second to fourth embodiments, the pinion-side lubricating oil sealing mechanism 72 is provided as a mechanism for sealing grease (lubricating oil) in the spline coupling portion 49 between the output shaft 15 and the pinion 16. The pinion-side lubricating oil sealing mechanism 72 is thus configured so as to prevent the grease supplied from the grease supply port 11d to the spline coupling portion 49 from leaking from the spline coupling portion 49. The pinion-side lubricating oil sealing mechanism 72 includes a sealing structure for providing sealing against the flow of grease from the spline coupling portion 49.

Figure 12:
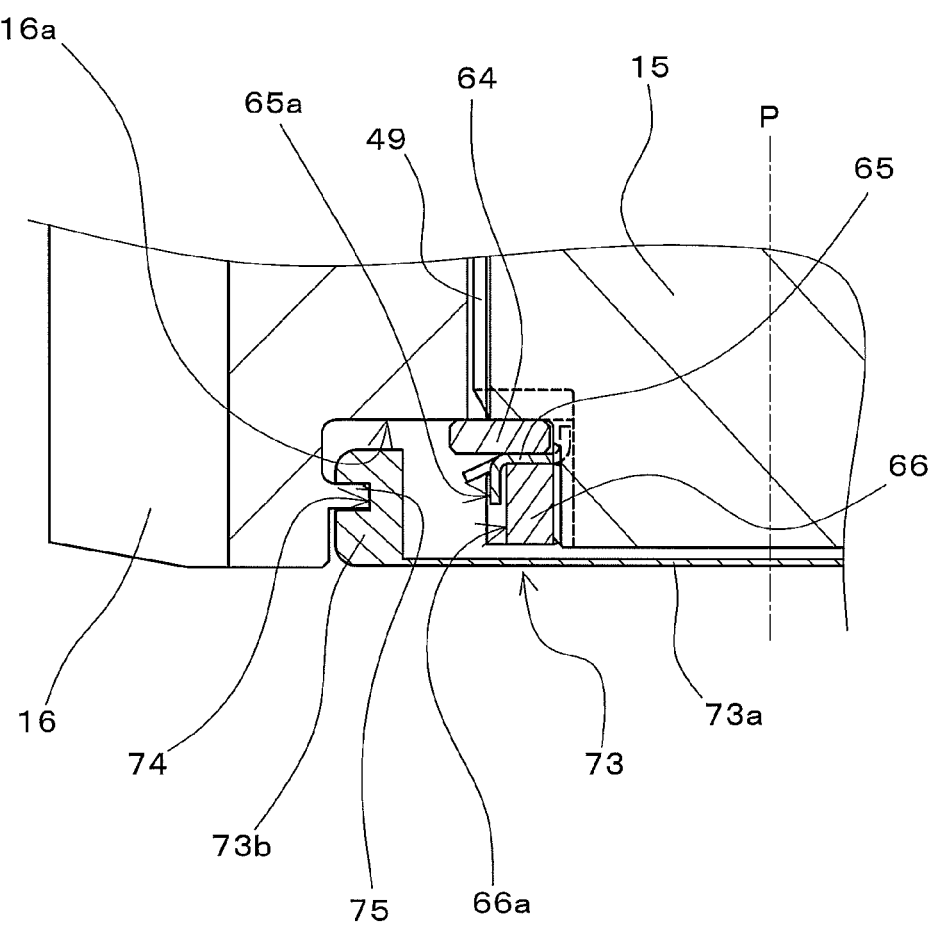
FIG. 12 is a cross-sectional view showing, in an enlarged scale, the output shaft and the pinion on one end side in the windmill pitch driving apparatus shown in FIG. 11.

FIG. 12 is a cross-sectional view showing, in an enlarged scale, the output shaft 15 and the pinion 16 on the one end side shown in FIG. 11. As shown in FIGS. 11 and 12, the aforementioned sealing structure for providing sealing against the flow of grease from the spline coupling portion 49 includes a cover seal member 73 and the O-ring seal 68. The cover seal member 73 includes a flat plate portion 73a that is formed in the shape of a circular flat plate, and an outer circumferential wall portion 73b that extends along the entire outer circumference of the flat plate portion 73a and is formed as a cylindrical wall portion. The cover seal member 73 is formed like a cover shape to cover the end of the output shaft 15 on the one end side, and the outer circumference of its outer circumferential wall portion 67b is attached in intimate contact to the end of the pinion 16 on the one end side. Note that the cover seal member 73 is attached in intimate contact to the end of the pinion 16 on the one end side such that its outer circumferential wall portion 73b is fitted in part of the inner circumference of the recessed portion 16a of the pinion 16 formed on the one end side. Such attachment of the cover seal member 73 to the end of the pinion 16 on the one end side prevents leakage of the grease in the spline coupling portion 49 and in the recessed portion 16a from between the outer circumference of the cover seal member 73 and the inner circumference of the pinion 16 on the one end side.

The cover seal member 73 is made of an elastically deformable material such as a resin material. A groove-like recessed portion 74 is formed circumferentially extending in a groove shape in the outer circumference of the outer circumferential wall portion 73b of the cover seal member 73. Meanwhile, a projecting raised portion 75 configured to extend circumferentially and to be engaged with the groove-like recessed portion 74 is formed on the inner circumference of the pinion 16 on the one end side. With this configuration, the projecting raised portion 75 and the groove-like recessed portion 74 are fitted to and engaged with each other by temporary elastic deformation of the cover seal member 73. This maintains a state in which the outer circumferential wall portion 73b of the cover seal member 73 is attached in intimate contact to the end of the pinion 16 on the one end side.

Furthermore, with the cover seal member 73 disposed as described above, the ring nut 66, which is a pressure-applying fixing portion, is disposed in the recessed portion 16a on the other end side with respect to the cover seal member 73 and covered with the cover seal member 73 together with the output shaft 15 on the one end side. In this way, the cover seal member 73 is formed as a cap-like member for sealing grease that constitutes a lid for covering the outer sides of the spline coupling portion 49, the pressure-applying fixing portion, and the end of the output shaft 15.

The O-ring seal 68 is configured as in the fourth embodiment and disposed between the positioning member 62 on the one end side and the pinion 16 on the other end side so as to abut on the positioning member 62 and the pinion 16, thus constituting a fourth seal member in the present embodiment. Note that, in the pinion-side lubricating oil sealing mechanism 72, the outer circumferential side of the O-ring seal 68 is fitted in and supported by a stepped portion that is formed on the inner circumference of the pinion 16 on the other end side so as to extend circumferentially and to be recessed inwardly, facing the outer circumference of the O-ring seal 68. The provision of the O-ring seal 68 provides sealing against the flow of grease from the spline coupling portion 49 on the other end side to the outside.

The above-described pitch driving apparatus 5 operates in the same manner as the pitch driving apparatus 1 of the first embodiment, and the pitch angle of the blade 105 is controlled by the operation of the pitch driving apparatus 5. When the hub 104 rotates, the pitch driving apparatus 5 rotates around the shaft center of the hub 104 together with the blade 105, and the pinion 16 rotates around the hub 104 as well. At this time, the occurrence of vibrations or backlash is prevented because the pinion 16 is firmly fixed to the output shaft 15 in a state in which pressure is applied to the pinion 16 by the fixing mechanism 71. Even if the pitch driving apparatus 5 rotates, the pinion-side lubricating oil sealing mechanism 72 seals the grease supplied in the spline coupling portion 49 and prevents leakage of the grease from the spline coupling portion 49.

The above-described pitch driving apparatus 5, which is configured as an eccentric speed reducer, is capable of achieving improved output torque and reduced size. In addition, in the windmill pitch driving apparatus 5, the fixing mechanism 71 is provided in order to fix the pinion 16 to the output shaft 15, and the pinion-side lubricating oil sealing mechanism 72 is provided, which includes the sealing structure for providing sealing against the flow of lubricating oil from the spline coupling portion 49. Accordingly, leakage of the grease supplied in the spline coupling portion 49 is prevented, and lubrication in the spline coupling portion 49 is ensured. This prevents the occurrence of fretting wear in the spline coupling portion 49 and suppresses the occurrence of damage to the output shaft 15 and the pinion 16, thus improving the durability of the windmill pitch driving apparatus 5.

It is thus possible according to the present embodiment to provide the windmill pitch driving apparatus 5 that is capable of achieving improved durability as well as improved output torque and reduced size.

Furthermore, according to the windmill pitch driving apparatus 5, the outer circumference of the cover seal member 73, which covers the end of the output shaft on the one end side, is attached in intimate contact to the end of the pinion 16 on the one end side, which prevents the flow of grease from the spline coupling portion 49 on the one end side. Accordingly, the flow of grease from the spline coupling portion 49 on the one end side can be efficiently prevented with a single seal member, namely the cover seal member 73, which is attached to the pinion 16 and covers the end of the output shaft 15. This reduces the number of constituent members of the pinion-side lubricating oil sealing mechanism 72 and simplifies the configuration thereof.

Furthermore, according to the windmill pitch driving apparatus 5, the cover seal member 73 is configured so as to be fitted in intimate contact with the inner circumference of the recessed portion 16a formed in the end of the pinion 16. Accordingly, the cover seal member 73, which provides sealing against the flow of grease from the one end side of the spline coupling portion 49, can be made compact and space-efficient.

Furthermore, according to the windmill pitch driving apparatus 5, the groove-like recessed portion 74 is formed in the outer circumference of the cover seal member 73, and the projecting raised portion 75 is formed on the inner circumference of the pinion 16. The groove-like recessed portion 74 and the projecting raised portion 75 are fitted to and engaged with each other by temporary elastic deformation of the cover member 73, and as a result, the cover seal member 73 is attached in intimate contact to the inner circumference of the pinion 16 on the one end side. Accordingly, the intimate attachment of the cover seal member 73 to the pinion 16 can be easily achieved with a simple configuration in which the projecting raised portion 75 and the groove-like recessed portion 74, which are to be engaged with each other, are provided in the pinion 16 and the elastically deformable cover seal member 73.

Furthermore, according to the windmill pitch driving apparatus 5, the pressure-applying fixing portion provided as the ring nut 66 is disposed in the recessed portion 16a of the pinion 16, and the one end side of the pressure-applying fixing portion is covered with the cover seal member 67 together with the output shaft 15. Accordingly, the pressure-applying fixing portion and the cover seal member 73 can be made compact and space-efficient by disposing the pressure-applying fixing portion in the recessed portion 16a formed in the end of the pinion 16 and further disposing the cover seal member 73 so as to cover the pressure-applying fixing portion.

Furthermore, like the windmill pitch driving apparatus 4 of the fourth embodiment, the windmill pitch driving apparatus 5 is provided with the O-ring seal 68 as a fourth seal member. Accordingly, even if the positioning portion is formed separately from the pinion 16 as the positioning member 62, the O-ring seal 68 provides sealing against the flow of grease from the spline coupling portion 49 on the other end side to the outside.

Modifications

Although the above has been a description of the embodiments of the present invention, the present invention is not intended to be limited to the above-described embodiments, and various modifications may be made within the scope recited in the claims. For example, the following modifications are conceivable in order to carry out the present invention.

The present invention is also applicable to a windmill pitch driving apparatus provided with a centercrank speed reduction portion in which crankshafts are disposed on the axis of the output shaft. The struts, which provide a connection between the base carrier and the end carrier, may be formed separately from the base carrier. The numbers of crankshafts and the numbers of struts may be different from the examples of the present embodiments. The type of each bearing may be changed where appropriate for carrying out the present invention.

In the fixing mechanism of the first embodiment, the shapes of the disc springs and the ring nuts may be changed where appropriate for carrying out the present invention, and the disc springs may not necessarily be provided. Furthermore, in the fixing mechanism of the first embodiment, the positioning portion may be integrally formed with the pinion, instead of being a positioning member that is formed separately from the pinion. Furthermore, in the fixing mechanism of the first embodiment, the multiple ring nuts may be disposed so as to abut on one another in a direction not oblique but parallel to the axial direction of the output shaft. In the fixing mechanism of the second embodiment, disc springs may be additionally provided, and the fixing bolts may bias the pinion via the presser plate member and the disc springs.

Figure 13:
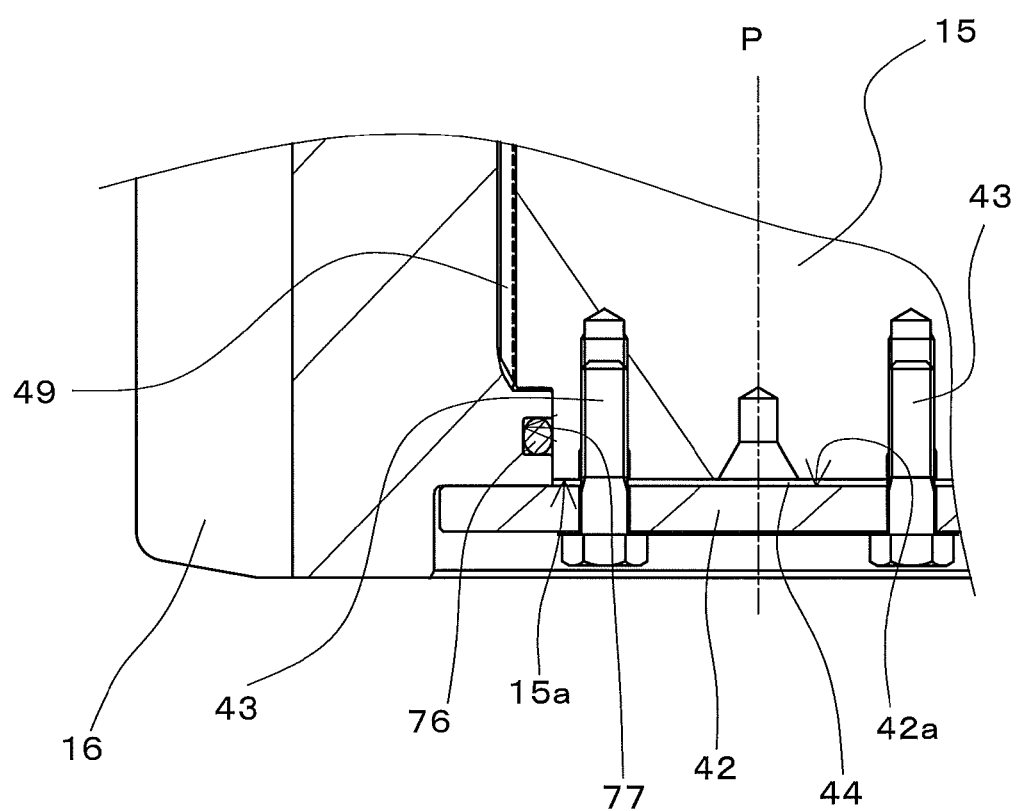
FIG. 13 is a cross-sectional view showing, in an enlarged scale, part of a cross section of a windmill pitch driving apparatus according to a modification.

In the sealing structure of the pinion-side lubricating oil sealing mechanism of the second or third embodiment, a seal member (third seal member) that is disposed so as to abut on the output shaft and the pinion may be provided, instead of the first seal member and the second seal member. FIG. 13 is a diagram showing such a modification that a third seal member 76 is provided, instead of the first and second seal members (45 and 46), in the windmill pitch driving apparatus 2 of the second embodiment. FIG. 13 is a cross-sectional view showing, in an enlarged scale, part of a cross section of a windmill pitch driving apparatus according to the modification and showing the output shaft 15 and the pinion 16 on the one end side in an enlarged scale. Note that constituent elements that are the same as those of the second embodiment have been given the same reference numerals in the drawing, and descriptions thereof have been omitted.

As illustrated in FIG. 13, in the case where the third seal member 76 is disposed so as to abut on the output shaft 15 and the pinion 16, both of the output shaft 15 and the pinion 16 are desirably configured, for example, such that a portion of a diameter that is reduced inwardly stepwise in the radial direction of the output shaft 15 is formed on both the outer circumference of the output shaft 15 and the inner circumference of the pinion 16 on the one end side of the spline coupling portion 49, the portions being slidably in contact with each other. With this configuration, a groove portion 77 may be formed extending circumferentially in one of the portions of the stepwise reduced diameter of the output shaft 15 and the pinion 16 (in the example of FIG. 13, the pinion 16), and the third seal member 76 may be disposed in the groove portion 77. Accordingly, the sealing structure for providing sealing against the flow of grease from the spline coupling portion 49 on the one end side can be achieved with a single seal member disposed between the output shaft 15 and the pinion 16. The flow of lubricating oil from the spline coupling portion 49 on the one end side can thus efficiently be prevented by the single third seal member 76, which reduces the number of constituent members of the pinion-side lubricating oil sealing mechanism and simplifies the configuration thereof.

Furthermore, in the pinion-side lubricating oil sealing mechanism of the second embodiment, the first seal member may not necessarily be a single large-diameter seal member disposed on the outer side of the multiple fixing bolts. For example, the first seal member may be provided as multiple small-diameter seal members disposed respectively on the outer side of the respective fixing bolts.

In the second and third embodiments, the positioning member of the fixing mechanism may be formed separately from the pinion as a positioning member. In this case, the sealing structure of the pinion-side lubricating oil sealing mechanism may further include, in addition to the first and second seal members, a seal member (fourth seal member) that is disposed between the pinion and the positioning portion so as to abut on the pinion and the positioning portion. This enables the flow of grease from the spline coupling portion on the other end side to the outside to be further prevented.

Although the descriptions of the fourth and fifth embodiments give the example in which the cover seal member is fitted in the inner circumference of the recessed portion of the pinion, the present invention is not limited to this example, and the cover seal member may be attached to the pinion at a position other than on the inner circumference of the recessed portion. Although the description of the fourth embodiment gives the example in which the cover seal member has a two-layer structure, the cover seal member may have a single-layer structure or a multi-layer structure that includes three or more layers. Although the description of the fifth embodiment gives the example in which the groove-like recessed portion is provided in the outer circumference of the cover seal member and the projecting raised portion is provided on the inner circumference of the pinion, the present invention is not limited to this example, and a configuration is also possible in which a projecting raised portion is provided on the outer circumference of the cover seal member and a groove-like recessed portion is provided in the inner circumference of the pinion.

INDUSTRIAL APPLICABILITY

The present invention is widely applicable as a windmill pitch driving apparatus that can be provided in a windmill and used as a driving apparatus for controlling the pitch angle of a blade that is rotatably provided on the main shaft portion of the windmill.

DESCRIPTIONS OF REFERENCE NUMERALS

1 Windmill pitch driving apparatus
11 Casing
15 Output shaft
16 Pinion
17 Fixing mechanism
19 Internal tooth pins
21 Crankshaft
22, 22a, 22b External tooth gear
23 Base carrier
24 End carrier
25 Strut
29 External tooth
30 Crank hole
36 Positioning member (positioning portion)
39a, 39b Ring nut (pressure-applying fixing portion)
101 Windmill
104 Hub (main shaft portion)
105 Blade

The invention claimed is:

1. A windmill pitch driving apparatus, which can be provided in a windmill and used as a driving apparatus for controlling a pitch angle of a blade that is rotatably provided on a main shaft portion of the windmill, comprising:
a casing;
a plurality of internal tooth pins disposed on an inner circumference of the casing and formed as pin-shaped members;
an external tooth gear housed in the casing and provided with external teeth formed on its outer circumference that mesh with the internal tooth pins;
a crankshaft extending through a crank hole formed in the external tooth gear, and configured to rotate so as to let the external tooth gear rotate eccentrically;
a base carrier rotatably holding the crankshaft on one end side;
an end carrier rotatably holding the crankshaft on the other end side;
a strut disposed between the base carrier and the end carrier so as to provide a connection between the base carrier and the end carrier;
an output shaft fixed to the base carrier;
an output pinion attached by spline coupling to the output shaft on the one end side;
a fixing mechanism for fixing the pinion to the output shaft; and
a pinion-side lubricating oil sealing mechanism for sealing lubricating oil in a spline coupling portion between the output shaft and the pinion, the mechanism including a sealing structure configured to provide sealing against a flow of the lubricating oil from the spline coupling portion,
wherein the pinion-side lubricating oil sealing mechanism further includes a one-end-side member disposed on the one end side with respect to the output shaft and the pinion and abutting on the pinion on the one end side, and a bolt configured to extend through the one-end-side member and to be threadedly engaged with an end of the output shaft on the one end side,
the sealing structure including:
a first seal member disposed between the output shaft and the one-end-side member so as to provide sealing against a flow of lubricating oil in a direction from the spline coupling portion on the one end side toward the bolt; and
a second seal member disposed between the pinion and the one-end-side member so as to provide sealing against a flow of lubricating oil from the spline coupling portion on the one end side to an outer side in a radial direction of the output shaft that is perpendicular to an axial direction of the output shaft.

2. The windmill pitch driving apparatus according to claim 1, wherein
the fixing mechanism includes a positioning portion configured to position the pinion on the other end side with respect to the output shaft side, and a pressure-applying fixing portion configured to bias the pinion toward the output shaft in the axial direction of the output shaft from the one end side, the pressure-applying fixing portion being fixed to the output shaft while applying pressure to the pinion,
the pressure-applying fixing portion includes a presser plate member provided as the one-end-side member and configured to bias the pinion on the one end side, and a fixing bolt provided as the bolt and configured to extend through the presser plate member and to be threadedly engaged with the output shaft on the one end side,
a gap is formed between the end of the output shaft on the one end side and the presser plate member, and the fixing bolt is configured to be threadedly engaged with the output shaft so as to bias the pinion via the presser plate member and cause pressure on the pinion,
the first seal member abuts on the end of the output shaft on the one end side and the presser plate member, and is disposed on an inner side with respect to the spline coupling portion in the radial direction of the output shaft, and
the second seal member abuts on the pinion on the one end side and the presser plate member, and is disposed on an outer side with respect to the spline coupling portion in the radial direction of the output shaft.

3. The windmill pitch driving apparatus according to claim 2, wherein,
a plurality of the fixing bolts are provided, and
the first seal member is disposed on an outer side with respect to the plurality of the fixing bolts in the radial direction of the output shaft.

4. The windmill pitch driving apparatus according to claim 1, wherein
the one-end-side member is a cover member that is disposed so as to abut on the end of the output shaft on the one end side in a recessed portion formed in an end of the pinion on the one end side, and that is disposed such that an outer circumference of the cover member is fitted in and abuts on an inner circumference of the recessed portion of the pinion on the one end side, the bolt is a tap bolt configured to extend through the cover member and to be threadedly engaged with the output shaft on the one end side so as to fix the cover member to the output shaft, the first seal member abuts on the end of the output shaft on the one end side and the cover member, and is disposed on an inner side with respect to the spline coupling portion in the radial direction of the output shaft, and the second seal member abuts on an inner circumference of the pinion on the one end side and the outer circumference of the cover member, and is disposed on an outer side with respect to the spline coupling portion in the radial direction of the output shaft.

5. The windmill pitch driving apparatus according to claim 1, wherein the fixing mechanism includes a positioning portion configured to position the pinion on the other end side with respect to the output shaft side, and a pressure-applying fixing portion configured to bias the pinion toward the output shaft in the axial direction of the output shaft from the one end side, the pressure-applying fixing portion being fixed to the output shaft while applying pressure to the pinion, the positioning portion being a positioning member that is formed separately from the pinion, and the sealing structure further includes a fourth seal member that is disposed between the pinion and the positioning portion so as to abut on the pinion and the positioning portion.

6. The windmill pitch driving apparatus according to claim 5, wherein the fixing mechanism further includes a disc spring that is disposed around the output shaft between the pinion and the positioning portion.

7. A windmill pitch driving apparatus, which can be provided in a windmill and used as a driving apparatus for controlling a pitch angle of a blade that is rotatably provided on a main shaft portion of the windmill, comprising:

a casing;

a plurality of internal tooth pins disposed on an inner circumference of the casing and formed as pin-shaped members;

an external tooth gear housed in the casing and provided with external teeth formed on its outer circumference that mesh with the internal tooth pins;

a crankshaft extending through a crank hole formed in the external tooth gear, and configured to rotate so as to let the external tooth gear rotate eccentrically;

a base carrier rotatably holding the crankshaft on one end side;

an end carrier rotatably holding the crankshaft on the other end side;

a strut disposed between the base carrier and the end carrier so as to provide a connection between the base carrier and the end carrier;

an output shaft fixed to the base carrier;

an output pinion attached by spline coupling to the output shaft on the one end side;

a fixing mechanism for fixing the pinion to the output shaft; and a pinion-side lubricating oil sealing mechanism for sealing lubricating oil in a spline coupling portion between the output shaft and the pinion, the mechanism including a sealing structure configured to provide sealing against a flow of the lubricating oil from the spline coupling portion, wherein the sealing structure includes a cover seal member that is formed in a cover shape to cover the end of the output shaft on the one end side, and an outer circumference of which is attached in intimate contact to an end of the pinion on the one end side;

wherein the outer circumference of the cover seal member, attached in intimate contact to the end of the pinion on the one end side, is fitted in an inner circumference of a recessed portion of the pinion on the one end side, the recessed portion being formed in an end of the pinion on the one end side; and wherein a projecting raised portion extending circumferentially in a projecting shape is formed on one of the outer circumference of the cover seal member and the inner circumference of the pinion on the one end side, and a groove-like recessed portion extending circumferentially in a groove shape is formed on the other of the outer circumference of the cover seal member and the inner circumference of the pinion on the one end side, the groove-like recessed portion being configured to be engaged with the projecting raised portion, and the projecting raised portion and the groove-like recessed portion are fitted to and engaged with each other by temporary elastic deformation of the cover seal member.

8. The windmill pitch driving apparatus according to claim 7, wherein the fixing mechanism includes a positioning portion configured to position the pinion on the other end side with respect to the output shaft side, and a pressure-applying fixing portion configured to bias the pinion toward the output shaft in the axial direction of the output shaft from the one end side, the pressure-applying fixing portion being fixed to the output shaft while applying pressure to the pinion, the pressure-applying fixing portion being disposed on the other end side with respect to the cover seal member in the recessed portion and covered with the cover seal member together with the end of the output shaft on the one end side.

9. The windmill pitch driving apparatus according to claim 7, wherein the fixing mechanism includes a positioning portion configured to position the pinion on the other end side with respect to the output shaft side, and a pressure-applying fixing portion configured to bias the pinion toward the output shaft in the axial direction of the output shaft from the one end side, the pressure-applying fixing portion being fixed to the output shaft while applying pressure to the pinion, the pressure-applying fixing portion being disposed on the other end side with respect to the cover seal member in the recessed portion and covered with the cover seal member together with the end of the output shaft on the one end side.

10. A windmill pitch driving apparatus, which can be provided in a windmill and used as a driving apparatus for controlling a pitch angle of a blade that is rotatably provided on a main shaft portion of the windmill, comprising:

a casing;

a plurality of internal tooth pins disposed on an inner circumference of the casing and formed as pin-shaped members;

an external tooth gear housed in the casing and provided with external teeth formed on its outer circumference that mesh with the internal tooth pins;

a crankshaft extending through a crank hole formed in the external tooth gear, and configured to rotate so as to let the external tooth gear rotate eccentrically;

a base carrier rotatably holding the crankshaft on one end side;

an end carrier rotatably holding the crankshaft on the other end side;

a strut disposed between the base carrier and the end carrier so as to provide a connection between the base carrier and the end carrier;

an output shaft fixed to the base carrier;

an output pinion attached by spline coupling to the output shaft on the one end side;

a fixing mechanism for fixing the pinion to the output shaft; and a pinion-side lubricating oil sealing mechanism for sealing lubricating oil in a spline coupling portion between the output shaft and the pinion, the mechanism including a sealing structure configured to provide sealing against a flow of the lubricating oil from the spline coupling portion, wherein the sealing structure includes another seal member disposed so as to abut on the output shaft and the pinion, a portion of an inwardly stepwise reduced diameter is formed on both the outer circumference of the output shaft and the inner circumference of the pinion on the one end side with respect to the spline coupling portion, the portions being slidably in contact with each other, and a groove portion is formed extending circumferentially in one of the portions of the stepwise reduced diameter of the output shaft and the pinion, and the another seal member is disposed in the groove portion.

* * * * *